United States Patent
Shimoharai et al.

(10) Patent No.: US 11,001,705 B2
(45) Date of Patent: *May 11, 2021

(54) POLYESTER RESIN COMPOSITION, LIGHT-REFLECTOR COMPONENT CONTAINING SAME, LIGHT REFLECTOR, AND METHOD FOR PRODUCING POLYESTER RESIN COMPOSITION

(71) Applicant: TOYOBO CO., LTD., Osaka (JP)

(72) Inventors: Takuya Shimoharai, Shiga (JP); Satoru Horiguchi, Shiga (JP); Junichi Yasui, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 99 days.

This patent is subject to a terminal disclaimer.

(21) Appl. No.: 16/064,583

(22) PCT Filed: Dec. 21, 2016

(86) PCT No.: PCT/JP2016/088199
§ 371 (c)(1),
(2) Date: Jun. 21, 2018

(87) PCT Pub. No.: WO2017/110917
PCT Pub. Date: Jun. 29, 2017

(65) Prior Publication Data
US 2019/0002687 A1  Jan. 3, 2019

(30) Foreign Application Priority Data

Dec. 25, 2015 (JP) .............................. JP2015-255204
Dec. 25, 2015 (JP) .............................. JP2015-255208

(51) Int. Cl.
| | | |
|---|---|---|
| *C08L 67/02* | (2006.01) | |
| *C08J 3/22* | (2006.01) | |
| *C08K 5/098* | (2006.01) | |
| *C08L 25/14* | (2006.01) | |
| *G02B 1/04* | (2006.01) | |
| *G02B 5/08* | (2006.01) | |
| *C08J 3/20* | (2006.01) | |

(52) U.S. Cl.
CPC .............. *C08L 67/02* (2013.01); *C08J 3/203* (2013.01); *C08J 3/22* (2013.01); *C08J 3/226* (2013.01); *C08K 5/098* (2013.01); *C08L 25/14* (2013.01); *G02B 1/04* (2013.01); *G02B 5/08* (2013.01); *C08J 2367/02* (2013.01); *C08J 2425/14* (2013.01); *C08J 2467/02* (2013.01)

(58) Field of Classification Search
CPC . C08L 67/02; C08L 25/14; C08J 3/203; C08J 3/22; C08J 2367/02; C08J 2425/14; C08J 2467/02; C08J 3/226; C08K 3/226; C08K 5/098; G02B 1/04; G02B 5/08; G02B 67/00
USPC ........................................................ 524/394
See application file for complete search history.

(56) References Cited

U.S. PATENT DOCUMENTS

| | | | |
|---|---|---|---|
| 5,981,628 | A | 11/1999 | Takamoto et al. |
| 6,579,609 | B1 | 6/2003 | Talibuddin |
| 10,385,205 | B2 | 8/2019 | Shimoharai et al. |
| 10,550,262 | B2 | 2/2020 | Shimoharai et al. |
| 2002/0075686 | A1 | 6/2002 | Kosugi et al. |
| 2003/0096122 | A1 | 5/2003 | Mercx et al. |
| 2006/0142438 | A1 | 6/2006 | Ishii et al. |
| 2006/0270824 | A1 | 11/2006 | Leemans et al. |
| 2006/0291215 | A1 | 12/2006 | Shirai et al. |
| 2007/0185257 | A1 | 8/2007 | Wursche et al. |
| 2007/0254150 | A1 | 11/2007 | Seino et al. |
| 2007/0265382 | A1 | 11/2007 | Yamamoto |
| 2007/0275242 | A1 | 11/2007 | Gopal |
| 2007/0282056 | A1 | 12/2007 | Schellekens et al. |
| 2008/0064824 | A1 | 3/2008 | Suzuki et al. |
| 2008/0161468 | A1 | 7/2008 | Juikar et al. |
| 2008/0167410 | A1 | 7/2008 | Shim et al. |
| 2008/0246191 | A1 | 10/2008 | Agarwal et al. |

(Continued)

FOREIGN PATENT DOCUMENTS

| | | |
|---|---|---|
| CN | 1753930 | 3/2006 |
| CN | 101372550 | 2/2009 |

(Continued)

OTHER PUBLICATIONS

JP 2013-159732 A, machine translation, Google Patents. (Year: 2013).*
WO 2013146281 A1, machine translation, Google Patents. (Year: 2013).*
WO 2016117586 A1, machine translation, Google Patents. (Year: 2016).*
Office Action dated Dec. 3, 2019 in corresponding Chinese Patent Application No. 201680075670.7, with English translation.
Office Action dated Jan. 24, 2019 issued in corresponding U.S. Appl. No. 15/756,749.

(Continued)

*Primary Examiner* — Josephine L Chang
(74) *Attorney, Agent, or Firm* — Wenderoth, Lind & Ponack, L.L.P.

(57) ABSTRACT

A polyester resin composition includes a polyester resin A containing 70 to 100% by mass of a polybutylene terephthalate resin and 0 to 30% by mass of a polyethylene terephthalate resin, and includes a metal organic acid salt B that is either one or both of an alkali metal organic acid salt and an alkaline earth metal organic acid salt and a predetermined amount of a polyfunctional glycidyl group-containing styrene-based polymer C, and the polyester resin composition contains either one or both of alkali metal atoms and alkaline earth metal atoms in a predetermined amount based on 100 parts by mass of the polyester resin A, and further, the content of linear oligomers of polybutylene terephthalate or the content of the linear oligomers of polybutylene terephthalate and the linear oligomers of polyethylene terephthalate is less than or equal to 1000 mg/kg.

12 Claims, No Drawings

(56) References Cited

U.S. PATENT DOCUMENTS

| | | |
|---|---|---|
| 2009/0264611 A1 | 10/2009 | Hamano et al. |
| 2009/0318588 A1 | 12/2009 | Kim et al. |
| 2010/0309571 A1 | 12/2010 | Watari et al. |
| 2011/0004983 A1 | 1/2011 | Yagura et al. |
| 2013/0112271 A1 | 5/2013 | Ikehata et al. |
| 2013/0131255 A1 | 5/2013 | Pottie et al. |
| 2013/0253145 A1 | 9/2013 | Sakai et al. |
| 2014/0127441 A1 | 5/2014 | Nakamura et al. |
| 2014/0296386 A1 | 10/2014 | Maeda et al. |
| 2015/0068601 A1 | 3/2015 | Ikehata et al. |
| 2015/0087034 A1 | 3/2015 | Utsunomiya et al. |
| 2015/0368459 A1 | 12/2015 | Yamanaka et al. |
| 2017/0190906 A1 | 7/2017 | Mutou |
| 2018/0126714 A1 | 5/2018 | Motoshiromizu et al. |
| 2018/0282538 A1 | 10/2018 | Shimoharai et al. |
| 2018/0282539 A1 | 10/2018 | Yasui et al. |
| 2018/0319975 A1 | 11/2018 | Shimoharai et al. |
| 2019/0002687 A1 | 1/2019 | Shimoharai et al. |
| 2020/0010667 A1 | 1/2020 | Shimoharai et al. |
| 2020/0231801 A1 | 7/2020 | Shimoharai et al. |

FOREIGN PATENT DOCUMENTS

| | | | | |
|---|---|---|---|---|
| CN | 101410442 | 4/2009 | | |
| CN | 101428478 | 5/2009 | | |
| CN | 101501133 | 8/2009 | | |
| CN | 101679728 | 3/2010 | | |
| CN | 103237844 | 8/2013 | | |
| CN | 104672797 | 6/2015 | | |
| CN | 104861587 | 8/2015 | | |
| CN | 104918997 | 9/2015 | | |
| CN | 108026358 | 5/2018 | | |
| CN | 108473753 | 8/2018 | | |
| DE | 10 2009 020 211 | 11/2010 | | |
| EP | 3 327 085 | 5/2018 | | |
| JP | 6-9858 | 1/1994 | | |
| JP | 07-062116 | 3/1995 | | |
| JP | 10-30054 | 2/1998 | | |
| JP | 2001-089590 | 4/2001 | | |
| JP | 2002-121273 | 4/2002 | | |
| JP | 2003-026905 | 1/2003 | | |
| JP | 2004-075867 | 3/2004 | | |
| JP | 2004-175889 | 6/2004 | | |
| JP | 2004-323837 | 11/2004 | | |
| JP | 2006-117768 | 5/2006 | | |
| JP | 2006-176711 | 7/2006 | | |
| JP | 2007-146047 | 6/2007 | | |
| JP | 2007-161840 | 6/2007 | | |
| JP | 2008-280498 | 11/2008 | | |
| JP | 2008-291238 | 12/2008 | | |
| JP | 2009-102581 | 5/2009 | | |
| JP | 2009-227749 | 10/2009 | | |
| JP | 2009-235156 | 10/2009 | | |
| JP | 2009-292897 | 12/2009 | | |
| JP | 2010-155900 | 7/2010 | | |
| JP | 2010-189584 | 9/2010 | | |
| JP | 2013-159732 | 8/2013 | | |
| JP | 5284557 | 9/2013 | | |
| JP | 5292877 | 9/2013 | | |
| JP | 2014-28883 | 2/2014 | | |
| JP | 2014-210850 | 11/2014 | | |
| JP | 5864021 | 2/2016 | | |
| JP | 58-95567 | 3/2016 | | |
| JP | 2017-36442 | 2/2017 | | |
| JP | 2017-048374 | 3/2017 | | |
| JP | 6119936 | 4/2017 | | |
| JP | 61-97975 | 9/2017 | | |
| WO | 00/11071 | 3/2000 | | |
| WO | 2005/121254 | 12/2005 | | |
| WO | 2008/133262 | 11/2008 | | |
| WO | 2011/148992 | 12/2011 | | |
| WO | 2012/147871 | 11/2012 | | |
| WO | 2013/005823 | 1/2013 | | |
| WO | 2013/072310 | 5/2013 | | |
| WO | WO-2013146281 A1 * | 10/2013 | ............ | C08K 5/098 |
| WO | 2016/117586 | 7/2016 | | |
| WO | 2016/167084 | 10/2016 | | |
| WO | 2017/014239 | 1/2017 | | |
| WO | 2017/038581 | 3/2017 | | |
| WO | 2017/110917 | 6/2017 | | |
| WO | 2018/143077 | 8/2018 | | |
| WO | 2018/143100 | 8/2018 | | |

OTHER PUBLICATIONS

International Search Report dated Apr. 24, 2018 in International (PCT) Application No. PCT/JP2018/002535.

International Search Report dated Apr. 24, 2018 in International (PCT) Application No. PCT/JP2018/002536.

Notice of Grounds of Rejection dated Jul. 30, 2019 in Japanese Patent Application No. 2018-510892 with English translation.

Notice of Grounds of Rejection dated Jul. 30, 2019 in Japanese Patent Application No. 2018-510893 with English translation.

U.S. Appl. No. 15/756,761, filed Mar. 1, 2018, entitled "Thermoplastic Polyester Resin Composition and Light Reflector Using Same".

Journal of Zhejiang University (Science Edition) vol. 29, No. 1, Jan. 2002, pp. 67-72.

Office Action dated Jun. 27, 2019 in Chinese Patent Application No. 201680051102.3, with English translation.

Office Action dated Aug. 8, 2019, in U.S. Appl. No. 15/756,761.

International Search Report dated Oct. 25, 2016 in International Application No. PCT/JP2016/074662.

International Search Report dated Mar. 14, 2017 in International Application No. PCT/JP2016/088199.

U.S. Appl. No. 15/756,749, filed Mar. 1, 2018, entitled "Polyester Resin Composition, Light-Reflector Component Containing Same, and Light Reflector".

Notice of Grounds of Rejection dated May 9, 2017 in corresponding Japanese patent application No. 2017-511791, with English translation.

International Search Report dated Oct. 25, 2016 in International Application No. PCT/JP2016/074663.

Office Action dated Aug. 25, 2020 in U.S. Appl. No. 16/482,838.

Machine translation of WO 2017/038581 A1, InnovationQ Plus (IP.com). (Year: 2017) (provided by Examiner in U.S. Appl. No. 16/482,838).

Office Action dated Jan. 27, 2020 in U.S. Appl. No. 15/756,761.

Office Action dated Jul. 10, 2020 in U.S. Appl. No. 15/756,761.

U.S. Appl. No. 16/982,256, filed Sep. 18, 2020, entitled "Polyester Resin Composition Light-Reflector Component Containing Same, and Light Reflector".

Office Action dated Aug. 7, 2019, in Chinese Patent Application No. 201680051143.2, with English translation (previously submitted in IDS of Oct. 30, 2019).

International Search Report dated Jun. 18, 2019 in International (PCT) Application No. PCT/JP2019/012393.

Office Action dated Dec. 22, 2020, in corresponding Chinese Patent Application No. 201880009861.2, with English translation.

Office Action dated Feb. 3, 2021, in corresponding Chinese Patent Application No. 201880009854.2, with English translation.

* cited by examiner

POLYESTER RESIN COMPOSITION, LIGHT-REFLECTOR COMPONENT CONTAINING SAME, LIGHT REFLECTOR, AND METHOD FOR PRODUCING POLYESTER RESIN COMPOSITION

TECHNICAL FIELD

The present invention relates to a polyester resin composition, a light-reflector component containing the polyester resin composition, a light reflector, and a method for producing a polyester resin composition.

BACKGROUND ART

A polybutylene terephthalate resin has excellent characteristics in injection moldability, mechanical properties, heat resistance, electrical properties, chemical resistance, and the like, and is widely used for an injection molded article in the fields of automobile components, machine components, electrical components, communication components, and the like. In addition, the polybutylene terephthalate resin is also excellent in mold transferability, therefore, is also used as a lamp member to be applied to an extension of an automobile that requires particularly favorable appearance.

However, it is known that when the polybutylene terephthalate resin is continuously molded, various kinds of gases (hereinafter, also referred to as "outgases") are generated during molding, and further, an oligomer of polybutylene terephthalate, and the like adhere to a mold, remain on the mold, and become residues on mold. The residues on mold may impair the appearance of the molded article. Therefore, in order to constitute a component constituting a lamp for an automobile, which is required to have high brightness appearance (smoothness) and uniform reflectivity, etc., other lighting fixtures, or the like, a light-reflector component provided with a light reflection layer on a surface, or the like, in a case where a conventional polybutylene terephthalate resin is used, it is required to frequently clean the mold during continuous molding. In order to clean the mold, the production has to be suspended temporarily, therefore, the productivity is adversely influenced. According to this, a polybutylene terephthalate resin capable of suppressing the residues on mold has been demanded.

CITATION LIST

Patent Document

PTD 1: Japanese Patent Laying-Open No. 2014-028883
PTD 2: Japanese Patent Laying-Open No. 2004-323837

SUMMARY OF INVENTION

Technical Problems

As a method for suppressing the generation of the above-described outgas, a method for inactivating a catalyst by using phenylsulfonic acid has been proposed in Japanese Patent Laying-Open No. 2014-028883 (PTD 1) or the like, and the reduction effect has been recognized. However, there is no description concerning the reduction of the oligomers of a polybutylene terephthalate resin, therefore, there is a room for the improvement in suppressing residues on mold. In Japanese Patent Laying-Open No. 2004-323837 (PTD 2), there is a description concerning the reduction of cyclic oligomers such as cyclic dimers and cyclic trimers, however, there is no description concerning the linear oligomer as described later, and it has been insufficient to suppress the residues on mold.

As a result of intensive studies to suppress the residues on mold at the time of continuous molding, the present inventors have found that the fundamental cause of the accumulation of the residues on mold by continuous molding is not in the cyclic oligomers such as cyclic dimers and cyclic trimers, which have been known so far, but in linear oligomers, and thus have completed the present invention. In addition, the present inventors have found that by obtaining the low gas emission that reduces the outgas generated at the time of molding, an improvement effect is exerted on the residues on mold and fogging, and thus have completed the present invention.

That is, an object of the present invention is to provide a polyester resin composition that has low gas emission, can significantly suppress the residues on mold at the time of continuous molding, and further shows low fogging, a light-reflector component containing the polyester resin composition, a light reflector, and a method for producing a polyester resin composition.

Solutions to Problems

That is, the present invention is as follows.

[1] A polyester resin composition, including a polyester resin A containing 70 to 100% by mass of a polybutylene terephthalate resin and 0 to 30% by mass of a polyethylene terephthalate resin, in which the polyester resin composition contains a metal organic acid salt B being either one or both of an alkali metal organic acid salt and an alkaline earth metal organic acid salt, and a polyfunctional glycidyl group-containing styrene-based polymer C in an amount of 0.05 to 3 parts by mass based on 100 parts by mass of the polyester resin A, and the polyester resin composition contains either one or both of alkali metal atoms and alkaline earth metal atoms in an amount of 0.000005 to 0.05 parts by mass based on 100 parts by mass of the polyester resin A, and further, the polyester resin composition has a content of linear oligomers of polybutylene terephthalate of, or a content of the linear oligomers of polybutylene terephthalate and linear oligomers of polyethylene terephthalate of less than or equal to 1000 mg/kg.

[2] The polyester resin composition described in [1], in which the polyester resin composition contains either one or both of the alkali metal atoms and the alkaline earth metal atoms in an amount of 0.0005 to 0.05 parts by mass based on 100 parts by mass of the polyester resin A.

[3] The polyester resin composition described in [1] or [2], in which the polyester resin composition has a content of titanium atoms of less than or equal to 50 mg/kg.

[4] The polyester resin composition described in any one of [1] to [3], in which a metal kind of the metal organic acid salt B is one or two or more kinds selected from the group consisting of lithium, sodium, potassium, calcium, and magnesium.

[5] The polyester resin composition described in any one of [1] to [4], in which the metal organic acid salt B is one or two or more kinds selected from the group consisting of lithium acetate, sodium acetate, potassium acetate, calcium acetate, magnesium acetate, lithium benzoate, sodium benzoate, and potassium benzoate.

[6] A light-reflector component, including the polyester resin composition described in any one of [1] to [5].

[7] A light reflector, in which a light reflective metal layer is formed at least on a part of a surface of the light-reflector component described in [6].

[8] A method for producing a polyester resin composition containing a polyester resin A, a metal organic acid salt B, and a polyfunctional glycidyl group-containing styrene-based polymer C, the method including the step of adding a master pellet containing the metal organic acid salt B, in which the polyester resin A contains 70 to 100% by mass of a polybutylene terephthalate resin and 0 to 30% by mass of a polyethylene terephthalate resin, the metal organic acid salt B is either one or both of an alkali metal organic acid salt and an alkaline earth metal organic acid salt, the master pellet contains either one or both of alkali metal atoms and alkaline earth metal atoms in an amount of 200 to 15000 mg/kg, and the polyester resin composition contains either one or both of the alkali metal atoms and the alkaline earth metal atoms in an amount of 0.0005 to 0.05 parts by mass based on 100 parts by mass of the polyester resin A and contains the polyfunctional glycidyl group-containing styrene-based polymer C in an amount of 0.05 to 3 parts by mass based on 100 parts by mass of the polyester resin A.

[9] The method for producing a polyester resin composition described in [8], in which the master pellet contains at least the polybutylene terephthalate resin.

[10] The method for producing a polyester resin composition described in [8] or [9], in which the polyester resin composition has a content of titanium atoms of less than or equal to 50 mg/kg.

[11] The method for producing a polyester resin composition described in any one of [8] to [10], in which a metal kind of the metal organic acid salt B is one or two or more kinds selected from the group consisting of lithium, sodium, potassium, calcium, and magnesium.

[12] The method for producing a polyester resin composition described in any one of [8] to [11], in which the metal organic acid salt B is one or two or more kinds selected from the group consisting of lithium acetate, sodium acetate, potassium acetate, calcium acetate, magnesium acetate, lithium benzoate, sodium benzoate, and potassium benzoate.

Advantageous Effects of Invention

According to the present invention, a polyester resin composition that has low gas emission, can significantly suppress the residues on mold at the time of continuous molding, and shows low fogging can be provided.

DESCRIPTION OF EMBODIMENTS

Hereinafter, the present invention will be described in detail.

[Polyester Resin Composition]

The present invention is a polyester resin composition including a polyester resin A that contains 70 to 100% by mass of (greater than or equal to 70% by mass and less than or equal to 100% by mass, in a case where a numerical range is expressed using "to" in the present specification, the range includes the numerical values of the upper limit and the lower limit) a polybutylene terephthalate resin and 0 to 30% by mass of a polyethylene terephthalate resin. The polyester resin composition contains a metal organic acid salt B being either one or both of an alkali metal organic acid salt and an alkaline earth metal organic acid salt, and a polyfunctional glycidyl group-containing styrene-based polymer C in an amount of 0.05 to 3 parts by mass based on 100 parts by mass of the polyester resin A. Further, the polyester resin composition contains either one or both of alkali metal atoms and alkaline earth metal atoms in an amount of 0.000005 to 0.05 parts by mass based on 100 parts by mass of the polyester resin A. Furthermore, in the polyester resin composition, the content of linear oligomers of polybutylene terephthalate, or the content of the linear oligomers of polybutylene terephthalate and the linear oligomers of polyethylene terephthalate is less than or equal to 1000 mg/kg.

By containing a metal organic acid salt B, the polyester resin composition according to the present invention can suppress the generation of outgas [tetrahydrofuran (hereinafter, may also be referred to as "THF"), and the like] during molding, suppress the transportation and adhesion of the cyclic oligomers and linear oligomers contained in the composition to a mold by THF, and suppress the residues on mold based on these oligomers. Further, by containing a polyfunctional glycidyl group-containing styrene-based polymer C, the outgas (free organic acid, and the like), cyclic oligomers, and linear oligomers, which have been generated during molding, can be captured, the low fogging can be achieved, and further the polyester resin composition can contribute to the suppression of residues on mold.

In addition, the polyester resin composition may contain a release agent D described later, and further does not exclude the addition of an inorganic filler for the purpose of improving the heat resistance and the rigidity. Further, the polyester resin composition may contain various kinds of additives as needed within the range not impairing the effects of the present invention. Examples of the additive include a modifier, a heat-resistant stabilizer, an antioxidant, a UV absorber, a light stabilizer, a plasticizer, a denaturant, an antistatic agent, a flame retardant, a dye, and a pigment. In the polyester resin composition of the present invention, the total of the polyester resin A, the metal organic acid salt B, the polyfunctional glycidyl group-containing styrene-based polymer C, and the release agent D (provided that the mixing of the release agent D is arbitrary) occupies preferably greater than or equal to 85% by mass, more preferably greater than or equal to 90% by mass, and furthermore preferably greater than or equal to 95% by mass.

Further, the polyester resin composition according to the present invention has low gas emission, and further can significantly suppress the residues on mold at the time of continuous molding, and in particular, it is effective to apply the polyester resin composition to a component constituting a lamp for an automobile, a lighting fixture, etc., a light-reflector component provided with a light reflection layer on the surface, or the like.

<Polyester Resin A>

A polyester resin A in the present invention contains 70 to 100% by mass of a polybutylene terephthalate resin, and 0 to 30% by mass of a polyethylene terephthalate resin. The polyester resin A is preferably composed of these two components although it is not excluded that the polyester resin A contains a third component other than the polybutylene terephthalate resin and the polyethylene terephthalate resin. The polyester resin A in the polyester resin composition is not particularly limited as long as the polyester resin A is the main component, and preferably greater than or equal to 90% by mass, and more preferably greater than or equal to 92% by mass.

(Polybutylene Terephthalate Resin)

A polybutylene terephthalate resin is a polymer that can be obtained by a common polymerization method, for example, by a polycondensation reaction of a dicarboxylic acid having terephthalic acid or an ester forming derivative thereof as the main component with a diol having 1,4- butanediol or an ester forming derivative thereof as the main component. In the polybutylene terephthalate resin, the repeating unit of butylene terephthalate is preferably greater than or equal to 80% by mole, more preferably greater than or equal to 90% by mole, furthermore preferably greater than or equal to 95% by mole, and most preferably 100% by mole.

The polybutylene terephthalate resin may contain other polymerization components within the range not impairing the characteristics, for example, in an amount of less than or equal to around 20% by mass. Examples of the polybutylene terephthalate resin containing other polymerization components include polybutylene (terephthalate/isophthalate), polybutylene (terephthalate/adipate), polybutylene (terephthalate/sebacate), polybutylene (terephthalate/decane dicarboxylate), polybutylene (terephthalate/naphthalate), and poly(butylene/ethylene) terephthalate. These components may be used singly alone, or by mixing greater than or equal to two kinds thereof.

The intrinsic viscosity (IV) of the polybutylene terephthalate resin is suitably 0.3 to 1.6 dl/g, more suitably 0.45 to 1.35 dl/g, furthermore suitably 0.5 to 1.2 dl/g, and particularly suitably 0.55 to 1.05 dl/g. When the intrinsic viscosity (IV) of the polybutylene terephthalate resin is 0.3 to 1.6 dl/g, the polyester resin composition of the present invention has favorable mechanical properties and moldability. As for the above-described intrinsic viscosity (IV), using a mixed solvent of phenol/tetrachloroethane (mass ratio 1/1) by a Ubbelohde-type viscometer, a time (seconds) required for the dropping of each of a polybutylene terephthalate resin solution having a concentration of 0.4 g/dl at 30° C., and the mixed solvent only is measured, and the intrinsic viscosity (IV) is a value obtained from the following equation (I) on the basis of ASTM D4603.

$$\text{Intrinsic viscosity (IV)} = 0.25(\eta_r - 1 + 3 \ln \eta_r)/C \quad \text{(I)}$$

In the above-described equation (I), $\eta_r = \eta/\eta_0$, $\eta$ is a time (seconds) required for the dropping of the polybutylene terephthalate resin solution, $\eta_0$ is a time (seconds) required for the dropping of the mixed solvent only, and C is a concentration (g/dl) of a polybutylene terephthalate resin solution.

The terminal carboxyl group of the polybutylene terephthalate resin plays a catalytic role in a hydrolysis reaction of a polymer, therefore, the hydrolysis is accelerated as the amount of the terminal carboxyl group is increased. For this reason, it is preferred that this terminal carboxyl group concentration is low. The terminal carboxyl group concentration of the polybutylene terephthalate resin is preferably less than or equal to 40 eq/ton, more preferably less than or equal to 30 eq/ton, furthermore preferably less than or equal to 25 eq/ton, and particularly preferably less than or equal to 20 eq/ton.

The terminal carboxyl group concentration (unit: eq/ton) of the polybutylene terephthalate resin can be measured, for example, by dissolving a predetermined amount of a polybutylene terephthalate resin in benzyl alcohol, and by titrating the resultant mixture using a 0.01 mol/l benzyl alcohol solution of sodium hydroxide. For the indicator, for example, a phenolphthalein solution may be used.

The terminal hydroxyl group of the polybutylene terephthalate resin causes backbiting mainly when melted, therefore becomes a starting point for forming THF that is one of outgasses, linear oligomers, and cyclic oligomers during molding. For this reason, in order to reduce the residues on mold, it is preferred that this terminal hydroxyl group concentration is reduced to suppress the backbiting during molding.

The terminal hydroxyl group concentration of the polybutylene terephthalate resin is preferably less than or equal to 110 eq/ton, more preferably less than or equal to 90 eq/ton, furthermore preferably less than or equal to 70 eq/ton, and particularly preferably less than or equal to 50 eq/ton.

The terminal hydroxyl group concentration (unit: eq/ton) of the polybutylene terephthalate resin can be calculated by a predetermined calculation, for example, on the basis of the spectrum obtained by $^1$H-NMR measurement, from the peak value of the terephthalic acid derived from polybutylene terephthalate, and the peak value of the terminal 1,4-butanediol.

(Polyethylene Terephthalate Resin)

A polyethylene terephthalate resin is a polymer that can be obtained by a common polymerization method, for example, by a polycondensation reaction of a dicarboxylic acid having terephthalic acid or an ester forming derivative thereof as the main component with a diol having ethylene glycol or an ester forming derivative thereof as the main component. In the polyethylene terephthalate resin, the repeating unit of ethylene terephthalate is preferably greater than or equal to 80% by mole, more preferably greater than or equal to 90% by mole, furthermore preferably greater than or equal to 95% by mole, and particularly preferably 100% by mole.

The polyethylene terephthalate resin can contain other polymerization components within the range not impairing the characteristics, for example, in an amount of less than or equal to around 20% by mass. Examples of the polyethylene terephthalate resin containing other polymerization components include polyethylene (terephthalate/isophthalate), polyethylene (terephthalate/adipate), polyethylene (terephthalate/sebacate), polyethylene (terephthalate/decane dicarboxylate), polyethylene (terephthalate/naphthalate), poly (ethylene/cyclohexane dimethyl) terephthalate, and poly (butylene/ethylene) terephthalate. These components may be used singly alone, or by mixing greater than or equal to two kinds thereof. By using the polyethylene terephthalate resins described above, the mold shrinkage factor of the polyester resin composition can be controlled in the present invention.

The intrinsic viscosity (IV) of the polyethylene terephthalate resin is suitably 0.36 to 1.6 dl/g, more suitably 0.45 to 1.35 dl/g, furthermore suitably 0.5 to 1.2 dl/g, and particularly suitably 0.55 to 1.05 dl/g. When the intrinsic viscosity (IV) of the polyethylene terephthalate resin is 0.36 to 1.6 dl/g, the polyester resin composition of the present invention has favorable mechanical properties and moldability. The above-described intrinsic viscosity (IV) may be measured by the same method as the method by which the intrinsic viscosity (IV) of the polybutylene terephthalate resin has been measured.

A polyester resin A in the present invention contains 70 to 100% by mass of a polybutylene terephthalate resin, and 0 to 30% by mass of a polyethylene terephthalate resin. The polyester resin A preferably contains 80 to 100% by mass of a polybutylene terephthalate resin, and 0 to 20% by mass of a polyethylene terephthalate resin; and more preferably contains 90 to 100% by mass of a polybutylene terephthalate resin, and 0 to 10% by mass of a polyethylene terephthalate resin. As described above, by containing a polyethylene terephthalate resin, the mold shrinkage factor of the polyester resin composition can be controlled, however, when the content of the polyethylene terephthalate resin exceeds 30% by mass, the releasability at the time of injection molding is deteriorated, and further the heat resistance of the polyester resin composition is lowered, therefore, this is not preferred.

The total amount of the polybutylene terephthalate resin and polyethylene terephthalate resin in the polyester resin A is preferably greater than or equal to 80% by mass, more preferably greater than or equal to 90% by mass, and furthermore preferably greater than or equal to 95% by mass. Further, the total amount of the polybutylene terephthalate resin and the polyethylene terephthalate resin may be 100% by mass.

(Titanium Catalyst)

The polybutylene terephthalate resin constituting the present invention can be obtained, for example, by an esterification reaction or a transesterification reaction using 1,4-butanediol and a titanium catalyst of terephthalic acid or terephthalic acid dialkyl. At this time, from the viewpoint of suppressing the decomposition by retention in a cylinder at the time of molding, it is preferred that in the polyester resin composition of the present invention, the content of titanium atoms is less than or equal to 50 mg/kg. That is, in the present invention, the content of the titanium catalyst to be contained in the polyester resin composition is defined by the content of titanium atoms. The content of titanium atoms is more preferably less than or equal to 45 mg/kg, furthermore preferably less than or equal to 40 mg/kg, and particularly preferably less than or equal to 35 mg/kg. The lower limit of the content of titanium atoms is preferably 5 mg/kg, more preferably 8 mg/kg, and furthermore preferably 15 mg/kg. When the content of titanium atoms exceeds 50 mg/kg, the suppressive effect on the residues on mold is hardly exerted.

The content of titanium atoms can be measured using a method of atomic emission, atomic absorption, or inductively coupled plasma (ICP), or the like after recovering the metal in the polymer by a method of wet ashing, or the like.

As the titanium catalyst, a known titanium compound can be used. Specific examples of the titanium catalyst include tetraalkyl titanate containing a titanium alkoxide such as tetraethyl titanate, tetraisopropyl titanate, tetra-n-propyl titanate, and tetra-n-butyl titanate, a partial hydrolysate thereof, a titanium chelate compound, titanium acetate, a titanyl oxalate compound such as titanyl oxalate, ammonium titanyl oxalate, sodium titanyl oxalate, potassium titanyl oxalate, calcium titanyl oxalate, and strontium titanyl oxalate, titanium trimellitate, titanium sulfate, titanium chloride, a hydrolysate of a titanium halide, titanium oxalate, titanium fluoride, potassium hexafluorotitanate, ammonium hexafluorotitanate, cobalt hexafluorotitanate, manganese hexafluorotitanate, titanium acetylacetonate, a titanium complex with a hydroxy polycarboxylic acid or a nitrogen-containing polycarboxylic acid, a composite oxide including titanium and silicon, or zirconium, a reactant of a titanium alkoxide and a phosphorus compound, and a reaction product of a titanium alkoxide and an aromatic polycarboxylic acid, or an acid anhydride thereof with a predetermined phosphorus compound.

Among them, from the viewpoint of suppressing the residues on mold, it is preferred to use any one selected from the group consisting of tetraalkyl titanate containing a titanium alkoxide such as tetraethyl titanate, tetraisopropyl titanate, tetra-n-propyl titanate, and tetra-n-butyl titanate, a partial hydrolysate thereof, and a titanium chelate compound. Further, it is more preferred to use any one selected from the group consisting of tetraisopropyl titanate, tetra-n-propyl titanate, tetra-n-butyl titanate, an ethyl acetoacetate titanium chelate, and triethanol titanium aminate.

Tin may be used as a catalyst in place of titanium or together with titanium. Further, in addition to titanium and tin, a magnesium compound such as magnesium acetate, magnesium hydroxide, magnesium carbonate, magnesium oxide, magnesium alkoxide, and magnesium hydrogen phosphate, a calcium compound such as calcium hydroxide, calcium carbonate, calcium oxide, calcium alkoxide, and calcium hydrogen phosphate, an antimony compound such as antimony trioxide, a germanium compound such as germanium dioxide, and germanium tetroxide, a manganese compound, a zinc compound, a zirconium compound, a cobalt compound, a phosphorus compound such as orthophosphoric acid, phosphorous acid, hypophosphorous acid, polyphosphoric acid, and an ester or metal salt thereof, and a reaction auxiliary such as sodium hydroxide may be used. In a case where the compound to be used as a reaction auxiliary overlaps with the metal organic acid salt B described later, the total amount of the metal organic acid salt B and the reaction auxiliary may be set to the content within the acceptable range as the metal organic acid salt B in the present invention.

(Linear Oligomer)

It is considered that in the present invention, the reason why the residues on mold during continuous molding can be suppressed is as follows.

In the polyester resin composition according to the present invention, the content of the linear oligomers of polybutylene terephthalate, or the content of the linear oligomers of polybutylene terephthalate and the linear oligomers of polyethylene terephthalate is less than or equal to 1000 mg/kg. In the present invention, a polybutylene terephthalate resin has the largest proportion in the polyester resin composition, therefore, it is preferred to suppress the content of the linear oligomers of polybutylene terephthalate to a low level. A linear oligomer has a melting point lower than that of a cyclic oligomer, and has a low glass transition temperature, therefore, easily adheres to a mold rather than the cyclic oligomer does. It is considered that the linear oligomer adhered to a mold becomes adhesive, plays a role as of a binder, and promotes the adhesion of the cyclic oligomer to the mold. For this reason, reduction of the content of the linear oligomers contained in the polyester resin composition extremely effectively contributes to the delaying of the start of the residues on mold at the time of continuous molding. Therefore, the reduction of the content of the linear oligomers is extremely important in suppressing the residues on mold.

As described above, in the present invention, it has been found that linear oligomers are the fundamental cause of the residues on mold. In addition, tetrahydrofuran is known to be generated by a backbiting reaction or the like of a terminal hydroxyl group, and from the outgas measurement described below, it has been also found that there is a positive correlation between the amount of the generated tetrahydrofuran and the degree of the residues on mold. That is, as the amount of the generated tetrahydrofuran is higher, the degree of the residues on mold becomes more severe. In this outgas measurement, a sample of 5 mg of the polyester resin composition is heated under the conditions at 265° C. for 10 minutes, the generated components are analyzed by using GS/MS (trade name: "TD-20/QP-2010 Ultra", manufactured by Shimadzu Corporation), and the amount of the generated tetrahydrofuran is measured. The detected components can be quantified in terms of toluene or the like.

Further, the residues on mold can be evaluated by performing an acceleration test or the like as described later.

From the above, the linear oligomers contained in the polyester resin composition are injected outside the resin system at the time of injection molding in a state of being dissolved in the tetrahydrofuran that is generated during molding, and comes into contact with a mold. It is considered that at this time, the tetrahydrofuran having a low boiling point evaporates without remaining in the mold, but the linear oligomers dissolved in the tetrahydrofuran adhere as they are to the mold. Therefore, the reduction of the content of the generated tetrahydrofuran that serves as a medium also leads to the suppression of distilling the linear oligomers from the resin system, and as a result, the amount of the linear oligomers adhered to the mold is reduced, and the residues on mold can be suppressed.

Herein, in the present specification, in a case where the linear oligomer is a linear oligomer of polybutylene terephthalate, the linear oligomer means an oligomer having a linear structure in which a total of 2 to 13 units of the constitutional units derived from terephthalic acid and the constitutional units derived from 1,4-butanediol, are bonded to one another. Further, in a case where the linear oligomer is a linear oligomer of polyethylene terephthalate, the linear oligomer means an oligomer having a linear structure in which a total of 2 to 13 units of the constitutional units derived from terephthalic acid and the constitutional units derived from ethylene glycol, are bonded to one another. The linear oligomer has reactive functional groups composed of a hydroxyl group or a carboxyl group at both terminals, and both terminals may be carboxyl groups or hydroxyl groups in some cases. In addition, in a case where the cyclic oligomer is a cyclic oligomer of polybutylene terephthalate, the cyclic oligomer means an oligomer having a cyclic structure in which a total of 4 to 14 units of the constitutional units derived from terephthalic acid and the constitutional units derived from 1,4-butanediol, are bonded to one another. Further, in a case where the cyclic oligomer is a cyclic oligomer of polyethylene terephthalate, the cyclic oligomer means an oligomer having a cyclic structure in which a total of 4 to 14 units of the constitutional units derived from terephthalic acid and the constitutional units derived from ethylene glycol, are bonded to one another.

As described above, in the polyester resin composition according to the present invention, the content of the linear oligomers of polybutylene terephthalate, or the content of the linear oligomers of polybutylene terephthalate and the linear oligomers of polyethylene terephthalate is less than or equal to 1000 mg/kg. The content of the linear oligomer is preferably less than or equal to 950 mg/kg, more preferably less than or equal to 900 mg/kg, furthermore preferably less than or equal to 800 mg/kg, and particularly preferably less than or equal to 700 mg/kg. When the content of the linear oligomers exceeds 1000 mg/kg, the effect of suppressing the residues on mold becomes insufficient. The lower limit value of the content of the linear oligomers is ideally 0 mg/kg. Further, in a case where both of the linear oligomers of polybutylene terephthalate and the linear oligomers of polyethylene terephthalate are contained, the content of the linear oligomers is less than or equal to 1000 mg/kg in both.

On the other hand, the content of the cyclic oligomers may be less than or equal to 9000 mg/kg. The content of the cyclic oligomers is preferably less than or equal to 8000 mg/kg, and more preferably 6000 mg/kg. However, even if the content of the cyclic oligomers is around 6000 mg/kg, when the content of the linear oligomers exceeds 1000 mg/kg, the effect of suppressing the residues on mold becomes lowered. When the content of the linear oligomers is less than or equal to 1000 mg/kg, as the content of the cyclic oligomers is lower, the effect of suppressing the residues on mold tends to become higher. In this regard, when the content of the linear oligomers is less than or equal to 1000 mg/kg, the content of the cyclic oligomers that have been conventionally considered to be the cause of the residues on mold is relatively flexibly accepted, and the cyclic oligomers may be contained up to less than or equal to 9000 mg/kg.

As for the content of the linear oligomers and the cyclic oligomers, for example, the polyester resin composition is dissolved in a solvent including hexafluoroisopropanol/chloroform=2/3 (volume ratio), and the resultant mixture is precipitated by adding chloroform, methanol, or the like. Subsequently, the supernatant separated by filtration is dry-solidified, the dry-solidified material is dissolved in dimethylformamide, then the resultant mixture is filtered, and by analyzing the filtrate by a liquid chromatography analysis method, the content of the linear oligomers and the cyclic oligomers can be measured. For example, the content (quantitative value) of the linear oligomers is expressed in terms of bishydroxyethyl terephthalate (BHET), and the content (quantitative value) of the cyclic oligomers can be calculated in terms of a polyethylene terephthalate cyclic trimer.

The method for reducing the content of the linear oligomers to less than or equal to 1000 mg/kg is not particularly limited as long as it is a method capable of reducing the content of the linear oligomers to less than or equal to 1,000 mg/kg. In the present invention, the proportion of the polybutylene terephthalate resin in the polyester resin composition is high, therefore, it is effective to reduce the content of the linear oligomers of the polybutylene terephthalate.

As the method for reducing the content of the linear oligomers to less than or equal to 1000 mg/kg, a method of adjusting with a titanium catalyst and a reaction auxiliary, a method of solid phase polymerization, a method of extracting linear oligomers with water or a solvent, or the like can be mentioned. As the method for reducing the content of cyclic oligomers to less than or equal to 9000 mg/kg, it is also not particularly limited, and for example, a method of adjusting temperature, time, a polymerization catalyst, and the like in polymerizing a polybutylene terephthalate resin, a method of solid phase polymerization, a method of heat-treating in a molten state after polymerization, a method for extracting cyclic oligomers by using a predetermined solvent, or the like can be mentioned. By the combination of these methods and other methods, both of the linear oligomers and the cyclic oligomers can also be reduced.

For example, in the method of solid phase polymerization of a polybutylene terephthalate resin, as the esterification or transesterification reaction proceeds, both of the terminal carboxyl group concentration and the terminal hydroxyl group concentration tend to lower. In this method, the molecular weight is increased, therefore, it is required to adjust the intrinsic viscosity (IV) before solid phase polymerization, and to adjust the temperature and time of solid phase polymerization.

In addition, in a case where a polyethylene terephthalate resin is contained in the polyester resin composition, the suppression of the content of the linear oligomers of polyethylene terephthalate can also contribute to the suppression of the residues on mold. Further, a method for reducing the amount of the generated tetrahydrofuran will be described in detail below.

<Metal Organic Acid Salt B>

The polyester resin composition according to the present invention contains a metal organic acid salt B that is either one or both of an alkali metal organic acid salt and an alkaline earth metal organic acid salt. The content is specified on the basis of either one or both of the alkali metal atoms and the alkaline earth metal atoms, specifically, either one or both of the alkali metal atoms and the alkaline earth metal atoms are contained in an amount of 0.000005 to 0.05 parts by mass based on 100 parts by mass of the polyester resin A. That is, in the present invention, the content of the metal organic acid salt B contained in the polyester resin composition is grasped by specifying the content of either one or both of the alkali metal atoms and the alkaline earth metal atoms.

Herein, the reason why the content of the metal organic acid salt B contained in the polyester resin composition is grasped by specifying the content of either one or both of the alkali metal atoms and the alkaline earth metal atoms is as follows. That is, it is considered that the metal organic acid salt B is present in a state in which the metal ions are dissociated in the polyester resin composition, therefore, in order to know the content of the metal organic acid salt B, it is required to quantify either one or both of the metal (ions) and the organic acid (ions). However, an organic acid tends to volatilize easily, and has a structure similar to that of a polymer such as polybutylene terephthalate in many cases, therefore, the quantitative determination becomes difficult in many cases. On the other hand, a metal atom (alkali metal atom and alkaline earth metal atom) is relatively easy to remain in the polyester resin composition, and the quantitative determination is relatively easy. Accordingly, the content of the metal organic acid salt B in the polyester resin composition is grasped by specifying the content of either one or both of the alkali metal atoms and the alkaline earth metal atoms. Further, from such a reason, it is clear that either one or both of the alkali metal atoms and the alkaline earth metal atoms are derived from the metal organic acid salt B.

In addition, the content of alkali metal atoms and alkaline earth metal atoms in the polyester resin composition can be measured by ICP emission spectrometry.

In other words, the polyester resin composition according to the present invention contains greater than or equal to 0.05 mg and less than or equal to 500 mg of either one or both of the alkali metal atoms and the alkaline earth metal atoms per kg mass of the polyester resin A (hereinafter, also referred to as "mg/kg"). Further, in a case where the metal organic acid salt B contains both of the alkali metal organic acid salt and the alkaline earth metal organic acid salt, both of the alkali metal atoms and the alkaline earth metal atoms are contained in an amount of 0.000005 to 0.05 parts by mass based on 100 parts by mass of the polyester resin A.

By the metal organic acid salt B, the backbiting reaction of the terminal hydroxyl group possessed by a polybutylene terephthalate resin at the time of molding can be reduced, and the amount of the generated THF can be reduced. In a case where either one or both of the alkali metal atoms and the alkaline earth metal atoms, which are derived from the metal organic acid salt B, are contained in an amount of less than 0.000005 parts by mass (0.05 mg/kg) based on 100 parts by mass of the polyester resin A, the suppressive effect on the residues on mold is hardly exerted by the action of the metal organic acid salt B. Further, in a case where either one or both of the alkali metal atoms and the alkaline earth metal atoms exceed 0.05 parts by mass (500 mg/kg) based on 100 parts by mass of the polyester resin A, it may promote the decomposition of the polyester resin composition, and may deteriorate the residues on mold and the fogging.

In addition, it is preferred that the polyester resin composition contains either one or both of the alkali metal atoms and the alkaline earth metal atoms in an amount of 0.0005 to 0.05 parts by mass based on 100 parts by mass of the polyester resin A. This numerical range is more preferably 0.0005 to 0.04 parts by mass (5 to 400 mg/kg), furthermore preferably 0.0006 to 0.03 parts by mass (6 to 300 mg/kg), and particularly preferably 0.0007 to 0.02 parts by mass (7 to 200 mg/kg).

The metal kind of the metal organic acid salt B, which can be used in the polyester resin composition of the present invention, is preferably one or two or more kinds selected from the group consisting of lithium, sodium, potassium, calcium, and magnesium from the viewpoint of the residues on mold. Among them, lithium, sodium, and potassium are more preferred, and potassium is most preferred.

Specific examples of the salt of an alkali metal or an alkaline earth metal include salts of these metals of a saturated aliphatic carboxylic acid such as formic acid, acetic acid, propionic acid, butyric acid, and oxalic acid, an unsaturated aliphatic carboxylic acid such as acrylic acid, and methacrylic acid, an aromatic carboxylic acid such as benzoic acid, a halogen-containing carboxylic acid such as trichloroacetic acid, a hydroxycarboxylic acid such as lactic acid, citric acid, salicylic acid, and gluconic acid, an organic sulfonic acid such as 1-propanesulfonic acid, 1-pentanesulfonic acid, and naphthalene sulfonic acid, an organic sulfuric acid such as lauryl sulfate, and a carbonic acid. Note that a carbonic acid salt is usually recognized as an inorganic acid salt, but in the present invention, an acid having carbon is regarded as an organic acid, and the carbonic acid salt is included in the range of organic acid salts.

From the viewpoint of the effect of suppressing the residues on mold and the handling ability, it is preferred that the metal organic acid salt B is one or two or more kinds selected from the group consisting of lithium acetate, sodium acetate, potassium acetate, calcium acetate, magnesium acetate, lithium benzoate, sodium benzoate, and potassium benzoate. Among them, one or two or more kinds selected from the group consisting of lithium acetate, sodium acetate, potassium acetate, calcium acetate, and magnesium acetate are preferred, and potassium acetate is particularly preferred. In addition, these metal organic acid salts B may be used singly alone or in combination with greater than or equal to two kinds thereof.

The method for allowing the metal organic acid salt B to be contained in the polyester resin composition is not particularly limited. For example, a method in which the metal organic acid salt B is added at an initial stage of the polymerization (after the esterification reaction or after the transesterification reaction) of the polybutylene terephthalate resin constituting a polyester resin A, a method in which the metal organic acid salt B is added at a later stage of the polymerization (during the polycondensation step (pressure reduction step) or after completion of the polymerization) of the polybutylene terephthalate resin, a method in which the metal organic acid salt B is allowed to adhere onto a surface of a pellet after pelletization or to permeate into a pellet, a method in which a master pellet containing the metal organic acid salt B in a high concentration is prepared in advance, and the master pellet is mixed at the time of the melt kneading for obtaining a polyester resin composition, or the like can be adopted. Further, a method in which a master pellet containing the metal organic acid salt B in a high concentration is added at the time of molding into a molded article may be adopted. Note that the above-described initial stage of the polymerization and later stage of the polymerization of the polybutylene terephthalate resin mean the initial stage of the polymerization and the later stage of the polymerization, respectively in the so-called melt polymerization of a polybutylene terephthalate resin.

In a case where the metal organic acid salt B is allowed to be contained when producing the polybutylene terephthalate resin, a part of the metal organic acid salt B to the added amount may be removed outside the reaction system under the reduced pressure condition in some cases. Therefore, the amount of the metal organic acid salt B to be added is required to be determined by taking into consideration the reactor to be used, the conditions, and the like, further after grasping the amount of the metal organic acid salt B (that is, either one or both of the alkali metal atoms and the alkaline earth metal atoms) remaining in the polyester resin composition by several times of trial experiments as needed. In addition, when the polyester resin composition of the present invention is produced by kneading using a twin-screw extruder or the like, there are some cases where the similar thing happens at the time of vent degassing (pressure reduction), therefore, it is required to determine the amount of the metal organic acid salt B to be added by taking necessary measures.

In particular, in the present invention, when constituting the polyester resin composition so that either one or both of the alkali metal atoms and the alkaline earth metal atoms, which are derived from the metal organic acid salt B, are contained in an amount of 0.0005 to 0.05 parts by mass (5 to 500 mg/kg) based on 100 parts by mass of the polyester resin A, the polyester resin composition is preferably obtained by using a master pellet containing the metal organic acid salt B in a high concentration. As the base resin of the master pellet, it is preferably any one of the resins that constitute the polyester resin composition, and more preferably a polybutylene terephthalate resin having the largest proportion in the polyester resin composition. The master pellet containing the metal organic acid salt B in a high concentration can be produced by mixing a base resin and the metal organic acid salt B, and melt-kneading the resultant mixture. The method of melt-kneading may be a known method, and a single-screw extruder, a twin-screw extruder, a pressure kneader, a Bunbury mixer, or the like can be used. Among them, a twin-screw extruder is preferably used.

The content of the metal organic acid salt B in master pellet is also specified on the basis of the content of either one or both of the alkali metal atoms and the alkaline earth metal atoms, and as the content, either one or both of the alkali metal atoms and the alkaline earth metal atoms is preferably 0.02 to 1.5 parts by mass (200 to 15000 mg/kg) based on 100 parts by mass of the master pellets. When the content in the master pellet exceeds 1.5 parts by mass, the base resin is decomposed at the time of the preparation of master pellets, and adverse influence may be exerted when the master pellets are allowed to be contained in the polyester resin composition. When the content in the master pellet is less than 0.02 parts by mass, the content of the metal organic acid salt B as the master pellet is small, and the productivity is not favorable.

The reason why these metal organic acid salts B have an effect of suppressing the residues on mold is presumed to be as follows. That is, the metal organic acid salt B suppresses a hydrolysis reaction of the polybutylene terephthalate resin due to the effect of stabilizing the ester group or the so-called buffer effect, and further suppresses a backbiting reaction of the terminal hydroxyl group. In this way, mainly the generation of tetrahydrofuran can be suppressed. Therefore, the polyester resin composition according to the present invention can obtain low gas emission, and a significant effect of suppressing the residues on mold.

The polyester resin composition according to the present invention has a tendency that the Color-b value in an L*a*b* color system is increased and the yellowish is also increased by including the metal organic acid salt B, however, from the viewpoint of the quality and the color blur when colored, it is preferred to suppress the Color-b value of the polyester resin composition to less than or equal to 6. Herein, the method of adding the metal organic acid salt B by the master pellet is preferred because of having a tendency that the Color-b value is decreased as compared with the method of adding the metal organic acid salt B at the time of the polymerization of a polybutylene terephthalate resin. The Color-b value of the polyester resin composition is more preferably less than or equal to 5, and furthermore preferably less than or equal to 4.

The Color-b value can be obtained, for example, by performing a measurement on a mirror surface of a flat plate having a mirror surface on one side thereof (molded using a mold having a mirror surface), which has been obtained by injection molding of a polyester resin composition, using a commercially available a precision-type spectrophotometric colorimeter or the like in accordance with HS Z 8722: 2009, and JIS Z 8781-4: 2013.

<Polyfunctional Glycidyl Group-Containing Styrene-Based Polymer C>

The polyester resin composition according to the present invention contains a polyfunctional glycidyl group-containing styrene-based polymer C in an amount of 0.05 to 3 parts by mass based on 100 parts by mass of the polyester resin A. By setting the content of the polyfunctional glycidyl group-containing styrene-based polymer C within such a range, gas components such as the free organic acids generated from a release agent D described later, cyclic oligomers, linear oligomers, monomers of polybutylene terephthalate and polyethylene terephthalate, and the like can be efficiently captured, and excellent low gas emission including low fogging can be realized. This also contributes to the suppression of the residues on mold.

When the polyfunctional glycidyl group-containing styrene-based polymer C exceeds 3 parts by mass, there is a risk that gelation occurs by the reaction with a polyester resin A. Further, when the polyfunctional glycidyl group-containing styrene-based polymer C is less than 0.05 parts by mass, there is a risk that the above-described capture cannot be performed efficiently and the effect to be obtained becomes insufficient. The mixing amount of the polyfunctional glycidyl group-containing styrene-based polymer C is preferably 0.1 to 2 parts by mass, and more preferably 0.15 to 1 part by mass based on 100 parts by mass of the polyester resin A.

Herein, the polyfunctional glycidyl group-containing styrene-based polymer C means a polymer that is constituted by copolymerizing a monomer containing a glycidyl group with a styrene-based monomer, and contains multiple glycidyl groups (preferably greater than or equal to 3 groups, and more preferably greater than or equal to 4 groups) in one molecule of the polymer. The polyfunctional glycidyl group-containing styrene-based polymer C can capture a gas component by an addition reaction of a glycidyl group in the molecule with the gas component such as a free organic acid generated from a release agent D. The reason why cyclic oligomers, linear oligomers, the above-described monomers, and the like can be captured is because of the addition reaction of a glycidyl group in the molecule.

As the polyfunctional glycidyl group-containing styrene-based polymer C, one having favorable compatibility with the polyester resin A is preferred. For example, it is preferred that the weight average molecular weight (Mw) of the polyfunctional glycidyl group-containing styrene-based polymer C is greater than or equal to 1000, and the epoxy value is greater than or equal to 0.5 meq/g. At this time, Mw is preferably greater than or equal to 5000, furthermore preferably greater than or equal to 7000, and particularly preferably greater than or equal to 8000. When the Mw is less than 1000, the glycidyl groups per molecule are reduced, and there is a risk that the above-described capture cannot be performed efficiently and the effect to be obtained becomes insufficient. Mw is preferably less than or equal to 50000 from the viewpoint of the compatibility with the polyester resin A. Further, the epoxy value is more preferably greater than or equal to 0.6 meq/g, furthermore preferably greater than or equal to 0.65 meq/g, and particularly preferably greater than or equal to 1.0 meq/g. When the epoxy value is less than 0.5 meq/g, there is a risk that the above-described capture cannot be performed efficiently and the effect to be obtained becomes insufficient. The epoxy value is preferably less than or equal to 3 meq/g from the viewpoint of suppressing the excessive reaction with the polyester resin A.

The specific chemical composition of the polyfunctional glycidyl group-containing styrene-based polymer C is preferably a copolymer of a glycidyl group-containing unsaturated monomer and a vinyl aromatic monomer.

The glycidyl group-containing unsaturated monomer is an unsaturated carboxylic acid glycidyl ester, an unsaturated glycidyl ether, or the like. Examples of the unsaturated carboxylic acid glycidyl ester include glycidyl acrylate, glycidyl methacrylate, and itaconic acid monoglycidyl ester. Among them, glycidyl methacrylate is preferably used. Examples of the unsaturated glycidyl ether include vinyl glycidyl ether, allyl glycidyl ether, 2-methylallyl glycidyl ether, and methacryl glycidyl ether. Among them, methacryl glycidyl ether is preferably used.

Examples of the vinyl aromatic monomer include a styrene-based monomer such as styrene, methyl styrene, dimethyl styrene, and ethyl styrene. Among them, it is preferred to use styrene.

As for the copolymerization ratio of the glycidyl group-containing unsaturated monomer and the vinyl aromatic monomer, the copolymerization amount of the glycidyl group-containing unsaturated monomer is preferably 1 to 30% by mass, and more preferably 2 to 20% by mass. When the copolymerization amount of the glycidyl group-containing unsaturated monomer is less than 1% by mass, the glycidyl groups per molecule are reduced, and there is a risk that the above-described capture cannot be performed efficiently and the effect to be obtained becomes insufficient. When the copolymerization amount of the glycidyl group-containing unsaturated monomer exceeds 30% by mass, there may be a case where the stability as the resin composition is impaired.

The polyfunctional glycidyl group-containing styrene-based polymer C may be copolymerized within the range in which the compatibility with polyester resin A is not impaired with an alkyl ester having 1 to 7 carbon atoms of acrylic acid or methacrylic acid, for example, a (meth)acrylic ester monomer such as a methyl (meth)acrylate, an ethyl (meth)acrylate, a propyl (meth)acrylate, an isopropyl (meth)acrylate, and a (meth)acrylic acid butyl ester, a (meth)acrylonitrile monomer, a vinyl ester monomer such as vinyl acetate, and vinyl propylate, a (meth)acrylamide monomer, and a monomer such as maleic anhydride, a maleic acid monoester, and a maleic acid diester. However, α-olefins such as ethylene, propylene, and 1-butene are not used for copolymerization because these have a tendency of impairing the compatibility with the polyester resin A.

The method for allowing the polyfunctional glycidyl group-containing styrene-based polymer C to be contained in the polyester resin composition is not particularly limited. For example, from the viewpoint of the handling ability, it is preferred to mix the polyfunctional glycidyl group-containing styrene-based polymer C at the time of melt-kneading to obtain the polyester resin composition.

In a case where the polyester resin composition is constituted by using a conventional polybutylene terephthalate resin, and a molded article obtained by molding the polyester resin composition is applied as a lamp component for an automobile, or the like, there has been a problem of the fogging that a cover of a headlamp of an automobile becomes yellowed and cloudy due to deterioration over time, and the like. The polyester resin composition of the present invention can effectively suppress the generation of the outgas that causes the cloudiness, by the polyfunctional glycidyl group-containing styrene-based polymer C, and can have excellent low fogging. Specifically, the polyester resin composition of the present invention can solve the above-described problem of fogging when the haze value of the glass plate after the fogging test (160° C.) is less than or equal to 5%. When the haze value of the glass plate after the fogging test exceeds 5%, the problem of fogging is generated practically in a cover of a headlamp of an automobile, other lighting fixtures, and the like. Further, the residues on mold are easily generated at the time of injection molding, and adverse influence may be exerted on the quality and productivity of the molded article.

The above fogging test can be performed by the following method. That is, multiple small specimens each having a size of around 40 mm×40 mm are cut out from the molded article (having a thickness of 2 mm) obtained by injection molding of a polyester resin composition. Next, 10 g of these small specimens in total is placed in a glass cylinder (for example, φ65×80 mm) whose bottom has been covered with aluminum foil, and the glass cylinder is placed upright on a known hot plate to be set. Further, the glass cylinder is covered with a slide glass (for example, 78 mm×76 mm×1 mm) so as not to form a gap, and then a heat treatment is performed at 160° C. for 24 hours on the hot plate. As a result of the heat treatment, a decomposed substance and the like sublimed from the polyester resin composition are precipitated and attached on the inner wall of the slide glass, and the haze value is measured on the slide glass using a known haze meter or the like. The haze value is determined from the ratio of the diffused transmitted light in the total light transmitted light, and can be used as an index of haze (%). It means that the smaller the haze value (to be transparent) is, the lower fogging the polyester resin composition has.

<Others>

(Release Agent D)

The polyester resin composition of the present invention may contain a release agent D in order to further improve the releasability. The release agent D is preferably a fatty acid ester compound from the viewpoint of suppressing the residues on mold. In this fatty acid ester compound, a compound in which carboxylic acid is partially esterified with monoglycol or polyglycol, and a compound partially forming a metal salt may be contained. Since the release agent D is a fatty acid ester compound, the formation of free fatty acids on the basis of the release agent D tends to be suppressed by the action of the metal organic acid salt B and the polyfunctional glycidyl group-containing styrene-based polymer C, and the residues on mold can be suppressed, and further can improve the fogging. The content of the release agent D is preferably 0.05 to 3 parts by mass based on 100 parts by mass of the polyester resin A. When the content of the release agent D is less than 0.05 parts by mass, a sufficient release effect cannot be obtained, and there is a risk that mold release failure, release wrinkles, or the like is generated. The release agent D itself gasifies, or bleeds out, and as a result, the residues on mold are caused. Further, for example, when a polyester resin composition containing the release agent D is applied to a lamp for an automobile, the release agent D adheres to a cover, a mirror, or the like of a headlamp under a temperature environment in the range of 100° C. to 200° C., and fogging is caused. These problems become remarkable when the content of the release agent D exceeds 3 parts by mass.

(Inorganic Filler)

The polyester resin composition according to the present invention may contain an inorganic filler within the range not impairing the effects of the present invention for the purpose of improving the heat resistance and the rigidity. As the kind of the inorganic filler, it is not particularly limited, and a known inorganic filler can be used. The inorganic filler may be surface-treated in order to improve the compatibility with the polyester resin composition and the dispersibility in the polyester resin composition. From the viewpoint of the surface appearance of a molded article of a polyester resin composition, the average particle diameter of the inorganic filler is preferably less than or equal to 3.0 μm. The content of the inorganic filler is preferably less than 1 part by mass, more preferably less than or equal to 0.8 parts by mass, and furthermore preferably less than or equal to 0.5 parts by mass based on 100 parts by mass of the polyester resin A. When the content of the inorganic filler is greater than or equal to 1 part by mass, in a case where a more advanced surface appearance (specularity) is required, there is a risk that the requirement may not be realized.

<Light-Reflector Component>

The light-reflector component according to the present invention contains the above polyester resin composition. The light-reflector component can be obtained by molding a polyester resin composition by a known method such as an injection molding method, an extrusion molding method, a blow molding method, or the like, and it is preferred that the light-reflector component is obtained by using an injection molding method from the viewpoint of the versatility. The light-reflector component becomes a light reflector described later by being provided with a light reflective metal layer.

<Light Reflector>

As for the light reflector according to the present invention, a light reflective metal layer is formed on at least a part of a surface of the above light-reflector component. For example, the light reflector can be obtained by directly forming a metal thin film (for example, aluminum foil) as a light reflective metal layer on at least a part of a surface of the light-reflector component. In particular, it is preferred that the light reflector is obtained by overlaying at least a part of a surface of the light-reflector component with a metal thin film by metallization. The metallization method is not particularly limited, and a known method can be used.

The light reflector according to the present invention can be used as various kinds of components, for example, a lamp for an automobile (headlamp, or the like), a light reflector (extension, reflector, housing, or the like), and further, a lighting fixture, an electrical component, an electronic component, household general goods, and the like.

[Method for Producing Polyester Resin Composition]

The present invention includes a method for producing a polyester resin composition containing a polyester resin A, a metal organic acid salt B, and a polyfunctional glycidyl group-containing styrene-based polymer C. In particular, the method of the present invention includes a step of adding a master pellet containing a metal organic acid salt B.

Herein, the content of the metal organic acid salt B in each of the polyester resin composition produced by the method for producing a polyester resin composition according to the present invention and the master pellet is specified on the basis of the content of either one or both of the alkali metal atoms and the alkaline earth metal atoms. Specifically, the polyester resin composition contains either one or both of the alkali metal atoms and the alkaline earth metal atoms in an amount of 0.0005 to 0.05 parts by mass based on 100 parts by mass of the polyester resin A. In other words, the polyester resin composition contains greater than or equal to 5 mg and less than or equal to 500 mg of either one or both of the alkali metal atoms and the alkaline earth metal atoms per kg mass of the polyester resin A. The master pellet contains either one or both of alkali metal atoms and alkaline earth metal atoms in an amount of 200 to 15000 mg/kg. That is, in the present invention, the content of the metal organic acid salt B contained in each of the polyester resin composition and the master pellet is grasped by specifying the content of either one or both of the alkali metal atoms and the alkaline earth metal atoms.

Note that, in a case where the metal organic acid salt B contains both of the alkali metal organic acid salt and the alkaline earth metal organic acid salt, the total of the alkali metal atoms and the alkaline earth metal atoms is contained in an amount of 0.0005 to 0.05 parts by mass based on 100 parts by mass of the polyester resin A.

As described above, the reason for specifying the content of the metal organic acid salt B in each of the polyester resin composition and the master pellet by the content of either one or both of the alkali metal atoms and the alkaline earth metal atoms is as follows. That is, it is considered that the metal organic acid salt B is present in a state in which the metal ions are dissociated in the polyester resin composition and the master pellet, therefore, in order to know the content of the metal organic acid salt B, it is required to quantify either one or both of the metal (ions) and the organic acid (ions). However, an organic acid tends to volatilize easily, and has a structure similar to that of a polymer such as polybutylene terephthalate in many cases, therefore, the quantitative determination becomes difficult in many cases. On the other hand, a metal atom (alkali metal atom and alkaline earth metal atom) is relatively easy to remain in the polyester resin composition and the master pellet, and the quantitative determination is relatively easy. Accordingly, the content of the metal organic acid salt B in each of the polyester resin composition and the master pellet is specified by specifying the content of either one or both of the alkali metal atoms and the alkaline earth metal atoms. Further, from such a reason, it is clear that either one or both of the alkali metal atoms and the alkaline earth metal atoms are derived from the metal organic acid salt B.

In addition, the content of alkali metal atoms and alkaline earth metal atoms in each of the polyester resin composition and the master pellet can be measured by ICP emission spectrometry.

By including a step of adding the master pellet, the polyester resin composition produced according to the present invention can suppress the generation of outgas [tetrahydrofuran (hereinafter, may also be referred to as "THF"), and the like] during molding by the action of the metal organic acid salt B. In this way, the transportation and adhesion of the cyclic oligomers and linear oligomers contained in the composition to a mold by THF are suppressed, and the residues on mold based on these oligomers can be suppressed. In particular, by including the above step, the polyester resin composition can contain the metal organic acid salt B in a high concentration, therefore, a more excellent effect that the residues on mold can be better suppressed can be obtained.

In the above step, a master pellet containing a metal organic acid salt B is prepared in advance, and the master pellet prepared in advance is mixed with components other than the metal organic acid salt B, the components are the polyester resin A, the polyfunctional glycidyl group-containing styrene-based polymer C, and the like. As the amount of the master pellets to be added at this time, it is preferred to add the master pellets by adjusting the amount so that either one or both of the alkali metal atoms and the alkaline earth metal atoms are contained in an amount of 0.0005 to 0.05 parts by mass based on 100 parts by mass of the polyester resin A.

In the present invention, for example, by mixing the master pellets with the components other than the metal organic acid salt B and subsequently melt-kneading the resultant mixture, a polyester resin composition can be produced. In this way, the period of time during which the polyester resin A is in a molten state in the presence of the metal organic acid salt B can be shortened, so that the decomposition of the polyester resin A is reduced. Therefore, deterioration of the color tone (increase in yellowish color) is suppressed, and the fogging resistance can be maintained.

Herein, all of the master pellets and the components other than the metal organic acid salt B may be mixed at the same time, or a part of the components may be mixed later. For example, in a case of using a twin-screw extruder that is a common melt kneader, all of the components may be added from the same place and mixed, or only some of the components may be mixed from a place on the downstream side.

Further, in the above step, either one or both of the release agent D and additive described later can be further added as needed. That is, in the present invention, there is no restriction on the order of mixing each of the components of a polyester resin A, a metal organic acid salt B (master pellets), a polyfunctional glycidyl group-containing styrene-based polymer C, a release agent D, and an additive, and the release agent D and the additive are optional components. It is within the range of the above step in the present invention to mix these components in random order.

As another method of the present invention, in the above step, master pellets can be added to raw material pellets containing components other than the metal organic acid salt B (hereinafter, may also be simply referred to as "raw material pellets"). Specifically, master pellets and raw material pellets are prepared in advance, and mixed to each other. As the amount of the master pellets to be added at this time, it is preferred to add the master pellets by adjusting the amount so that either one or both of the alkali metal atoms and the alkaline earth metal atoms, which are derived from a metal organic acid salt B, are contained in an amount of 0.0005 to 0.05 parts by mass based on 100 parts by mass of the polyester resin A. After that, the resultant mixture is melt-kneaded to produce a polyester resin composition. With such a method, the period of time during which the polyester resin A is in a molten state in the presence of the metal organic acid salt B can be shortened, so that the decomposition of the polyester resin A is reduced. Therefore, deterioration of the color tone (increase in yellowish color) is suppressed, and the fogging resistance can be maintained.

Further, also in this method, either one or both of the release agent D and additive described later can be added as needed. The release agent D and the additive may be contained in raw material pellets in advance or may be contained in a mixture of raw material pellets and master pellets at the time of mixing of the pellets. Note that the expression "raw material pellet" in the present specification is referred to as a composition obtained by mixing components other than a metal organic acid salt B and melt-kneading the resultant mixture, and means a pellet that is a raw material for a polyester resin composition to be produced according to the present invention.

It is more preferred that the master pellets contain at least a polybutylene terephthalate resin. This is because the polybutylene terephthalate resin is a resin having the largest proportion in the polyester resin composition produced according to the present invention as described later, and the dispersibility of the metal organic acid salt B in the polyester resin composition can be improved.

The master pellets and the raw material pellets can be prepared by mixing the corresponding raw materials, and melt-kneading the resultant mixture by a known melt-kneading method using a single-screw extruder, a twin-screw extruder, a pressure kneader, a Banbury mixer, or the like. Further, the master pellets may be prepared by adjusting the concentration at the time of the mixing, so that either one or both of alkali metal atoms and alkaline earth metal atoms, which are derived from a metal organic acid salt B, are contained in an amount of 200 to 15000 mg/kg. In a case where raw material pellets including, for example, a polyester resin A, and a polyfunctional glycidyl group-containing styrene-based polymer C are prepared, the raw material pellets may be prepared by adjusting the concentration at the time of the mixing, so that the polyfunctional glycidyl group-containing styrene-based polymer C is contained in an amount of 0.05 to 3 parts by mass based on 100 parts by mass of the polyester resin A.

In addition, as the melt-kneading method for producing a polyester resin composition, which is performed after master pellets are added to components other than a metal organic acid salt B or the above raw material pellets, any known method can be used. For example, the melt-kneading can be performed by using a single-screw extruder, a twin-screw extruder, a pressure kneader, a Bunbury mixer, or the like. Among them, a twin-screw extruder is preferably used. As the general melt-kneading conditions, in a case of using a twin-screw extruder, the cylinder temperature may be set to 230 to 270° C., and the kneading time may be set to 2 to 15 minutes.

In the present invention, the above step may be performed in a process of molding into a molded article. That is, within the scope of the present invention, a method in which master pellets are added to components other than a metal organic acid salt B, the resultant mixture is melt-kneaded to obtain a molten material for a polyester resin composition, the molten material is applied to a molding machine as it is to be formed into a molded article is included. Further, within the scope of the present invention, a method in which master pellets are added to raw material pellets, the resultant mixture is melt-kneaded to obtain a molten material for a polyester resin composition, the molten material is applied to a molding machine as it is to be formed into a molded article is also included.

As the time point of adding a metal organic acid salt B, in addition to the above-described two time points (the time point of adding to components other than the metal organic acid salt B and the time point of adding to raw material pellets), there may be the following timings. That is a timing of the initial stage of polymerization (after the esterification reaction or the transesterification reaction) of the polybutylene terephthalate resin constituting a polyester resin A, and a timing of the later stage of polymerization (during the polycondensation step (pressure reduction step) or after completion of the polymerization) of the polybutylene terephthalate resin. However, in a case where a metal organic acid salt B is added to a polybutylene terephthalate resin at these timings, the terephthalic acid as the raw material and the alkali metal or alkaline earth metal in the metal organic acid salt B form a salt, and an effect of the metal organic acid salt B is lost, therefore there is a risk that an effect of suppressing the residues on mold is lowered. In addition, as the formed salt precipitates and becomes seeds, a favorable appearance (mirror surface appearance showing particularly smoothness) cannot be obtained, and foreign substances such as the precipitated salts become a starting point of material destruction and the mechanical properties may also be lowered (in a case where the metal organic acid salt B is added after completion of the polymerization, uniform dispersion is difficult due to the high viscosity of the resin, and the metal organic acid salt B itself may become seeds). Accordingly, it is preferred to add the metal organic acid salt B as the master pellets to the above-described components other than the metal organic acid salt B or raw material pellets rather than adding the metal organic acid salt B at the time of the polymerization of a polybutylene terephthalate resin.

Further, as a method for adding a metal organic acid salt B, there is a method in which a metal organic acid salt B is allowed to adhere onto a surface of a polybutylene terephthalate resin or to permeate a polybutylene terephthalate resin by immersing the polybutylene terephthalate resin after polymerization in an aqueous solution of the metal organic acid salt B. However, it may be difficult to contain the metal organic acid salt B in a desired concentration by the method, therefore, this is not preferred. Further, the time of polymerization (initial stage of the polymerization and later stage of the polymerization) of the above-described polybutylene terephthalate resin means the time of polymerization (initial stage of the polymerization and later stage of the polymerization) in the so-called melt polymerization of a polybutylene terephthalate resin.

The content of either one or both of alkali metal atoms and alkaline earth metal atoms in the master pellet is 200 to 15000 mg/kg. When the content in the master pellet exceeds 15000 mg/kg, the base resin is decomposed at the time of the preparation of the master pellet, and adverse influence may be exerted when the master pellet constitutes the polyester resin composition. When the content in the master pellet is less than 200 mg/kg, the content of the metal organic acid salt B as the master pellet is small, and the productivity does not become favorable. The content of either one or both of alkali metal atoms and alkaline earth metal atoms in the master pellet is preferably 400 to 10000 mg/kg, and more preferably 600 to 5000 mg/kg.

In addition, the method for producing the polyester resin composition according to the present invention is not limited to the above-described production methods. For example, the polyester resin composition can be produced by mixing each of the above-described components, and an additive to be added as needed such as a stabilizer, and melt-kneading the resultant mixture. As the method of melt kneading, a known method can be used, and for example, the melt-kneading can be performed by using a single-screw extruder, a twin-screw extruder, a pressure kneader, a Bunbury mixer, or the like. Among them, a twin-screw extruder is preferably used. As the general melt-kneading conditions, in a case of using a twin-screw extruder, the cylinder temperature may be set to 230 to 270° C., and the kneading time may be set to 2 to 15 minutes.

The method for molding the polyester resin composition according to the present invention is not particularly limited, and the polyester resin composition can be molded by a known method such as injection molding, extrusion molding, blow molding, or the like. Among them, from the viewpoint of the versatility, an injection molding method is preferably used.

EXAMPLES

Hereinafter, the present invention is further specifically described by way of Examples (Examples I and II), however, the present invention is not limited to these Examples. Note that the measurement values described in Examples are the values measured by the following method.

Example I (1) Intrinsic viscosity (IV): the intrinsic viscosity (IV) of each of a polybutylene terephthalate resin "aI" and a polyethylene terephthalate resin "bI" was measured at 30° C. using a mixed solvent of phenol/tetrachloroethane (mass ratio 1/1) with an Ubbelohde-type viscometer. A time (seconds) required for the dropping of each of a polybutylene terephthalate resin "aI" solution having a concentration of 0.4 g/dl at 30° C., a polyethylene terephthalate resin "bI" solution having a concentration of 0.4 g/dl, and a mixed solvent only was measured, and a value was determined from the above equation (I).

(2) Terminal carboxyl group concentration (unit: eq/ton, expressed as the acid value): 0.5 g of a polybutylene terephthalate resin "aI" was dissolved in 25 ml of benzyl alcohol, and the resultant mixture was titrated by using a 0.01 mol/l benzyl alcohol solution of sodium hydroxide. The indicator used was a solution obtained by dissolving 0.10 g of phenolphthalein in a mixture of 50 ml of ethanol and 50 ml of water. The determination of the terminal carboxyl group concentration of the polyethylene terephthalate resin "bI" was also performed in the similar way.

(3) Terminal hydroxyl group concentration (unit: eq/ton): the determination of the terminal hydroxyl group concentration of the polybutylene terephthalate resin "aI" and the polyethylene terephthalate resin "bI" was performed by $^1$H-NMR measurement with a resonance frequency of 500 MHz. As the measurement device, an NMR device (trade name: "AVANCE-500", manufactured by Bruker Corporation) was used.

Firstly, 10 mg of a polybutylene terephthalate resin "aI" or 10 mg of a polyethylene terephthalate resin "bI" was dissolved in 0.12 ml of a solvent including deuterated chloroform/hexafluoroisopropanol=1/1 (volume ratio), and then into the resultant mixture, 0.48 ml of deuterated chloroform and 5 μl of deuterated pyridine were added and thoroughly stirred to prepare a resin solution. After that, the resin solution was filled in an NMR tube and subjected to $^1$H-NMR measurement. Deuterated chloroform was used as a lock solvent, and the number of times of integration was set to 128.

Next, when the peak of chloroform appeared at 7.29 ppm in the measured $^1$H-NMR spectrum, terephthalic acid peak (i) derived from polybutylene terephthalate or polyethylene terephthalate appeared at 8.10 ppm. Further, in a case of a polybutylene terephthalate resin "aI", the terminal 1,4-butanediol peak (ii) appeared at 3.79 ppm. In a case of a polyethylene terephthalate resin "bI", the terminal ethylene glycol peak (iii) appeared at 4.03 ppm. For these results, (i) to (iii) were taken as integral values of respective peaks, and the terminal hydroxyl group concentration was determined by the following equation.

In a case of a polybutylene terephthalate resin "aI": {(ii)×1000000/2}/{(i)×220/4}=terminal hydroxyl group concentration (eq/ton)

In a case of a polyethylene terephthalate resin "bI": {(iii)×1000000/2}/{(i)×192/4}=terminal hydroxyl group concentration (eq/ton)

(4) Titanium atom content, potassium atom content, and magnesium atom content: the polyester resin composition is wet-decomposed with high-purity sulfuric acid for electronic industry and high-purity nitric acid for electronic industry, and the measurement was performed by emission spectrometry using ICP (trade name: "SPECTROBLUE", manufactured by AMETEK. Inc.).

(5) Oligomer content: into 3 ml of a solvent including hexafluoroisopropanol/chloroform=2/3 (volume ratio), 0.1 g of a polyester resin composition is dissolved, and then into the resultant mixture, 20 ml of chloroform, and 10 ml of methanol were added to precipitate a polymer. Subsequently, the supernatant separated by filtration was dry-solidified, and then the dry-solidified material was dissolved in 10 ml of dimethylformamide, and then the resultant mixture was filtered, and the filtrate was subjected to quantitative determination of each of the oligomer components by a liquid chromatography analysis method. The quantitative value of the linear oligomers was calculated in terms of BHET (bishydroxyethyl terephthalate), and the quantitative value of the cyclic oligomers was calculated in terms of a polyethylene terephthalate cyclic trimer, each using a calibration curve. The measurement was performed under the following conditions.

Liquid chromatography analyzer: trade name: "Prominence" manufactured by Shimadzu Corporation Column: Shim-pack XR-ODS 2.2 μm (3×100 mm)

Mobile phase: A: 0.2% acetic acid water, B: acetonitrile

Gradient: 0 min (10% B), 25 min (100% B), 27 min (100% B), 27.01 min (10% B), 32 min (10% B)

Flow rate: 1.1 ml/min

Column temperature: 50° C.

Injection volume: 5 μl

Detection wavelength: UV 258 nm.

(6) Color-b value (flat plate): an injection molding machine (trade name: "EC100N", manufactured by TOSHIBA MACHINE CO., LTD.) was prepared, and a flat molded article of 100 mm×100 mm×2 mm made of a polyester resin composition was obtained by injection molding using a mold having a mirror surface that had been polished with a file of #6000. This flat molded article had a mirror surface transferred from the mold on one side of the flat molded article. The cylinder temperature at the time of molding was 260° C. and the mold temperature was 60° C.

Using a precision-type spectrophotometric colorimeter (trade name: "TC-1500SX", manufactured by Tokyo Denshoku CO., LTD.), the Color-b value on the mirror surface side of the flat molded article was measured in accordance with JIS Z 8722: 2009, and JIS Z 8781-4: 2013. As the measurement conditions, a D65 light source, a 10° field of view, and a 0°-d method were used.

(7) Fogging (haze value): using an injection molding machine (trade name: "EC100N" manufactured by TOSHIBA MACHINE CO., LTD.), a molded article made of a polyester resin composition was obtained. Multiple small specimens each having a size of around 30 mm×30 mm were cut out from the molded article, and 10 g of the small specimens in total was placed in a glass cylinder (φ65×80 mm) whose bottom had been covered with aluminum foil. The glass cylinder was placed upright on a hot plate (trade name: "Neo Hot Plate HT-1000" manufactured by AS ONE Corporation) to be set. Further, the glass cylinder was covered with a slide glass (78 mm×76 mm×1 mm), and then a heat treatment was performed for 24 hours by setting the preset temperature of the hot plate to be 160° C. As a result of the heat treatment, an adhered substance due to the decomposed substance and the like sublimed from the molded article was precipitated on the inner wall of the slide glass. For these slide glasses, the haze value (haze %) was measured using a haze meter (trade name: "NDH 2000" manufactured by NIPPON DENSHOKU INDUSTRIES CO., LTD.). It means that the smaller the haze value (to be transparent) is, the lower fogging the polyester resin composition has.

(8) Residues on mold acceleration test: an injection molding machine (trade name: "EC100N", manufactured by TOSHIBA MACHINE CO., LTD.) was prepared, and as the mold, a continuous molding evaluation type (having a cavity with an outer diameter of 30 mm, an inner diameter of 20 mm, and a thickness of 3 mm, and a flow terminal is a recessed part and no degassing) was prepared. Using this mold, a polyester resin composition was continuously molded by a short shot method so that the ingredients facilitating the residues on mold of outgas, oligomers, and the like are easily accumulated in a recessed part on the opposite side of a gate part, and the degree of the residues on mold was observed. The molding was performed with a cylinder temperature of 260° C., a mold temperature of 50° C., and a cycle time of 40 seconds at the time of molding, and the residues on mold after 20 shots was evaluated. The residues on mold were photographed with a digital camera, and an image obtained by subjecting the photographed image to gray scale processing in order to make the color of image uniform was evaluated as follows.

A: Residues are not observed

B: Residues are hardly observed

C: Residues are vaguely observed at the center in the vicinity of the recessed part on the opposite side of the gate part D: Residues are black and noticeable with a clear contour at the center in the vicinity of the recessed part on the opposite side of the gate part (9) Thermal deformation temperature (load: 0.45 MPa): using an injection molding machine (trade name: "EC100N" manufactured by TOSHIBA MACHINE CO., LTD.), a multipurpose test specimen of ISO-3167 was molded under the conditions of a cylinder temperature of 260° C. and a mold temperature of 60° C. For this multipurpose test specimen, a thermal deformation temperature was measured when loaded at 0.45 MPa in accordance with ISO-75.

The ingredients used in Examples and Comparative examples are shown below.

The polyester resin A includes any one of the following polybutylene terephthalate resins "aI", or includes any one of the following polybutylene terephthalate resins "aI", and a polyethylene terephthalate resin "bI".

As the polybutylene terephthalate resin "aI", any one of the following resins was used.

aI-1: IV=0.83 dl/g, terminal hydroxyl group=95 eq/ton, acid value=9 eq/ton, and titanium atom content=80 mg/kg (a melt-polymerized resin of IV=0.78 dl/g was used, and solid phase polymerization was performed at 210° C. until reaching IV=0.83 dl/g). Provided that as the metal organic acid salt B, potassium acetate 10 mg/kg was added at the time of melt polymerization (after esterification reaction) of the melt-polymerized resin.

aI-2: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that as the metal organic acid salt B, potassium acetate 10 mg/kg was added at the time of melt polymerization (after esterification reaction) of the melt-polymerized resin.

aI-3: IV=0.83 dl/g, terminal hydroxyl group=90 eq/ton, acid value=6 eq/ton, and titanium atom content=80 mg/kg (a melt-polymerized resin of IV=0.73 dl/g was used, and solid phase polymerization was performed at 210° C. until reaching IV=0.83 dl/g). Provided that as the metal organic acid salt B, potassium acetate 10 mg/kg was added at the time of melt polymerization (after esterification reaction) of the melt-polymerized resin.

aI-4: IV=0.83 dl/g, terminal hydroxyl group=90 eq/ton, acid value=9 eq/ton, and titanium atom content=30 mg/kg (a melt-polymerized resin of IV=0.73 dl/g was used, and solid phase polymerization was performed at 210° C. until reaching IV=0.83 dl/g). Provided that as the metal organic acid salt B, potassium acetate 10 mg/kg was added at the time of melt polymerization (after esterification reaction) of the melt-polymerized resin.

aI-5: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that as the metal organic acid salt B, potassium acetate 20 mg/kg was added at the time of melt polymerization (after esterification reaction) of the melt-polymerized resin.

aI-6: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that as the metal organic acid salt B, magnesium acetate 10 mg/kg was added at the time of melt polymerization (after esterification reaction) of the melt-polymerized resin.

aI-7: IV=0.83 dl/g (a resin obtained by melt polymerization), terminal hydroxyl group=100 eq/ton, acid value=10 eq/ton, and titanium atom content=80 mg/kg (no special treatment was performed to reduce the content of linear oligomers). Provided that as the metal organic acid salt B, potassium acetate 10 mg/kg was added at the time of melt polymerization (after esterification reaction) of the resin.

aI-8: IV=0.83 dl/g (a resin obtained by melt polymerization), terminal hydroxyl group=100 eq/ton, acid value=10 eq/ton, and titanium atom content=30 mg/kg (no special treatment was performed to reduce the content of linear oligomers). Provided that as the metal organic acid salt B, potassium acetate 10 mg/kg was added at the time of melt polymerization (after esterification reaction) of the resin.

aI-9: IV=0.83 dl/g, (a resin obtained by melt polymerization), terminal hydroxyl group=100 eq/ton, acid value=10 eq/ton, and titanium atom content=80 mg/kg (no special treatment was performed to reduce the content of linear oligomers). Provided that as the metal organic acid salt B, potassium acetate 90 mg/kg was added at the time of melt polymerization (after esterification reaction) of the resin.

aI-10: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that the metal organic acid salt B was not added.

aI-11: IV=0.83 dl/g, terminal hydroxyl group=95 eq/ton, acid value=9 eq/ton, and titanium atom content=80 mg/kg (a melt-polymerized resin of IV=0.78 dl/g was used, and solid phase polymerization was performed at 210° C. until reaching IV=0.83 dl/g). Provided that the metal organic acid salt B was added by master pellets at the time of melt kneading.

aI-12: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g). Provided that the metal organic acid salt B was added by master pellets at the time of melt kneading.

aI-13: IV=0.83 dl/g, terminal hydroxyl group=90 eq/ton, acid value=6 eq/ton, and titanium atom content=80 mg/kg (a melt-polymerized resin of IV=0.73 dl/g was used, and solid phase polymerization was performed at 210° C. until reaching IV=0.83 dl/g). Provided that the metal organic acid salt B was added by master pellets at the time of melt kneading.

aI-14: IV=0.83 dl/g, terminal hydroxyl group=90 eq/ton, acid value=6 eq/ton, and titanium atom content=30 mg/kg (a melt-polymerized resin of IV=0.73 dl/g was used, and solid phase polymerization was performed at 210° C. until reaching IV=0.83 dl/g). Provided that the metal organic acid salt B was added by master pellets at the time of melt kneading.

aI-15: IV=0.83 dl/g (a resin obtained by melt polymerization), terminal hydroxyl group=100 eq/ton, acid value=10 eq/ton, and titanium atom content=80 mg/kg (no special treatment was performed to reduce the content of linear oligomers). Provided that the metal organic acid salt B was added by master pellets at the time of melt kneading.

aI-16: IV=0.83 dl/g (a resin obtained by melt polymerization), terminal hydroxyl group=100 eq/ton, acid value=10 eq/ton, and titanium atom content=30 mg/kg (no special treatment was performed to reduce the content of linear oligomers). Provided that the metal organic acid salt B was added by master pellets at the time of melt kneading.

Note that to the polybutylene terephthalate resins "aI-1" to "aI-9", the metal organic acid salt B including the above-described amount of potassium acetate or magnesium acetate was added at the time of polymerization. The residual amount (content) of the metal organic acid salt B in the polyester resin composition was as shown in the following Tables 1 to 5 below. To the polybutylene terephthalate resins "aI-11" to "aI-16", the metal organic acid salt B including potassium acetate or magnesium acetate was adjusted so as to have the contents shown in the following Tables 1 to 5 by using the master pellets that had been prepared in advance, and added at the time of melt kneading to obtain a polyester resin composition. To the polybutylene terephthalate resin "aI-10", the metal organic acid salt B was not added.

Polyethylene terephthalate resin "bI": IV=0.62 dl/g, and acid value=30 eq/ton.

As the metal organic acid salt B, the following compounds were used.

BI-1: potassium acetate (manufactured by Wako Pure Chemical Industries, Ltd.)

BI-2: magnesium acetate (manufactured by Wako Pure Chemical Industries, Ltd.)

BI-3: master pellets of potassium acetate (manufactured by Wako Pure Chemical Industries, Ltd.)

BI-4: master pellets of magnesium acetate (manufactured by Wako Pure Chemical Industries, Ltd.)

Note that as the base resin of the above-described master pellets, the same resin as the polybutylene terephthalate resin present in the polyester resin composition to which the master pellets are added was used. The content of the metal organic acid salt B in the master pellet was determined on the basis of the content of potassium atoms in case of BI-3, and the content of magnesium in case of BI-4. As to the content, the potassium atom of BI-3 is 0.2 parts by mass based on 100 parts by mass of the master pellets, and the magnesium atom of BI-4 is 0.085 parts by mass based on 100 parts by mass of the master pellets.

As the polyfunctional glycidyl group-containing styrene-based polymer C, the following compounds were used.

CI-1: a styrene/glycidyl acrylate copolymer [trade name: "ARUFON UG-4050", manufactured by TOAGOSEI CO., LTD. (Mw: 8500, epoxy value: 0.67 meq/g, and refractive index: 1.55)]

CI-2: a styrene/glycidyl acrylate copolymer [trade name: "ARUFON UG-4070" manufactured by TOAGOSEI CO., LTD. (Mw: 9700, epoxy value: 1.4 meq/g, and refractive index: 1.57)].

As the release agent D, the following compounds were used.

DI-1: a triglycerol behenic acid full ester (trade name: "POEM TR-FB", manufactured by RIKEN VITAMIN Co., Ltd.)

DI-2: a mixture of a pentaerythritol stearic acid full ester and a pentaerythritol palmitic acid full ester (trade name: "Rikester EW-440A", manufactured by RIKEN VITAMIN Co., Ltd.).

As the stabilizer, an antioxidant (trade name: "IRGANOX 1010", manufactured by BASF) was used. This stabilizer was contained in an amount of 0.2 parts by mass based on 100 parts by mass of the polyester resin A.

Examples I-1 to I-21, and Comparative Examples I-1 to I-16

The ingredients mixed in the combinations shown in Tables 1 to 5 were kneaded in a co-rotating twin-screw extruder set at a cylinder temperature of 250° C. (260° C. in Examples I-9, I-18, and Comparative Examples I-8, I-14), and the obtained strands were water-cooled and pelletized. Each of the obtained pellets was dried at 130° C. for 4 hours, and a polyester resin composition corresponding to each of Examples and Comparative Examples was obtained. On these polyester resin compositions, each of the above-described evaluation tests (4) to (9) was performed.

With respect to the amount of metal organic acid salt B, in Examples and Comparative Examples in which the metal organic acid salt B had been added at the time of polymerization, the residual amount (content) in the polyester resin composition after melt kneading was decreased relative to the amount at the time of addition (it is considered that the metal organic acid salt B may have been distilled off in the pressure reduction step at the later stage, and in the vent degassing step at the time of melt kneading). Further, in Comparative Examples I-6 and I-7 (examples using a polybutylene terephthalate resin "aI-10"), the metal organic acid salt B was not added. The above results are shown in the following Tables 1 to 5.

TABLE 1

| | Kind | Unit | | Example I-1 | Example I-2 | Example I-3 | Example I-4 | Example I-5 | Example I-6 | Example I-7 | Example I-8 | Example I-9 |
|---|---|---|---|---|---|---|---|---|---|---|---|---|
| Mixed composition | Polyester resin (A) | parts by mass | aI-1 | 100 | — | — | — | — | — | — | — | — |
| | | | aI-2 | — | — | 100 | — | 100 | — | 100 | — | — |
| | | | aI-3 | — | 100 | — | — | — | — | — | — | — |
| | | | aI-4 | — | — | — | — | — | — | — | 100 | 90 |
| | | | aI-5 | — | — | — | 100 | — | — | — | — | — |
| | | | aI-6 | — | — | — | — | — | 100 | — | — | — |
| | | | bI | — | — | — | — | — | — | — | — | 10 |
| | Metal organic acid salt (B)[*1] | parts by mass | BI-1 | 0.0002 | 0.0002 | 0.0002 | 0.0004 | 0.0002 | — | 0.0002 | 0.0002 | 0.0002 |
| | | | BI-2 | — | — | — | — | — | 0.0002 | — | — | — |
| | Polyfunctional glycidyl group-containing styrene-based polymer (C) | parts by mass | CI-1 | 0.3 | 0.3 | 0.3 | 0.3 | — | 0.3 | 0.3 | 0.15 | 0.3 |
| | | | CI-2 | — | — | — | — | 0.3 | — | — | — | — |
| | Release agent (D) | parts by mass | DI-1 | 0.3 | 0.3 | 0.3 | 0.3 | 0.3 | 0.3 | — | 0.3 | 0.3 |
| | | | DI-2 | — | — | — | — | — | — | 0.3 | — | — |
| Properties of composition | Titanium atom content | mg/kg | | — | 80 | 80 | 30 | 30 | 30 | 30 | 30 | 27 |
| | Linear oligomer content | mg/kg | | — | 900 | 600 | 900 | 900 | 890 | 900 | 620 | 600 |

TABLE 1-continued

| | Kind | Unit | Example I-1 | Example I-2 | Example I-3 | Example I-4 | Example I-5 | Example I-6 | Example I-7 | Example I-8 | Example I-9 |
|---|---|---|---|---|---|---|---|---|---|---|---|
| Characteristics of molded article | Color-b | — | 1.8 | 1.8 | 1.9 | 2.3 | 1.9 | 1.9 | 1.9 | 1.9 | 1.9 |
| | Residues on mold | — | B | B | B | B | B | B | B | B | B |
| | Haze value | % | 4 | 4 | 3 | 3 | 2 | 3 | 3 | 3 | 3 |

[*1] The parts by mass of the metal organic acid salt (B) indicates the parts by mass of the metal atoms (potassium or magnesium) remaining in the polyester resin composition.

TABLE 2

| | Kind | Unit | | Example I-10 | Example I-11 | Example I-12 | Example I-13 | Example I-14 | Example I-15 | Example I-16 | Example I-17 | Example I-18 |
|---|---|---|---|---|---|---|---|---|---|---|---|---|
| Mixed composition | Polyester resin (A) | parts by mass | aI-11 | 100 | — | — | — | — | — | — | — | — |
| | | | aI-12 | — | — | 100 | 100 | 100 | 100 | 100 | — | — |
| | | | aI-13 | — | 100 | — | — | — | — | — | — | — |
| | | | aI-14 | — | — | — | — | — | — | — | 100 | 90 |
| | | | bI | — | — | — | — | — | — | — | — | 10 |
| | Metal organic acid salt (B) [*1] | parts by mass | BI-3 | 0.001 | 0.001 | 0.001 | 0.005 | 0.001 | — | 0.001 | 0.001 | 0.001 |
| | | | B1-4 | — | — | — | — | — | 0.001 | — | — | — |
| | Polyfunctional glycidyl group-containing styrene-based polymer (C) | parts by mass | CI-1 | 0.3 | 0.3 | 0.3 | 0.3 | — | 0.3 | 0.3 | 0.15 | 0.3 |
| | | | CI-2 | — | — | — | — | 0.3 | — | — | — | — |
| | Release agent (D) | parts by mass | DI-1 | 0.3 | 0.3 | 0.3 | 0.3 | 0.3 | 0.3 | — | 0.3 | 0.3 |
| | | | DI-2 | — | — | — | — | — | — | 0.3 | — | — |
| Properties of composition | Titanium atom content | mg/kg | — | 80 | 80 | 30 | 30 | 30 | 30 | 30 | 30 | 27 |
| | Linear oligomer content | mg/kg | — | 900 | 600 | 900 | 900 | 890 | 900 | 900 | 620 | 600 |
| Characteristics of molded article | Color-b | — | — | 1.8 | 1.8 | 2.0 | 2.6 | 2.0 | 2.0 | 2.0 | 2.0 | 2.0 |
| | Residues on mold | — | — | B | A | B | A | B | B | B | A | A |
| | Haze value | % | — | 4 | 4 | 3 | 3 | 2 | 3 | 3 | 3 | 3 |

[*1] The mass of the metal organic acid sat (B) indicates the atomic weight of the metal (potassium or magnesium) remaining in the polyester resin composition.

TABLE 3

| | Kind | Unit | | Example I-19 | Example I-20 | Example I-21 |
|---|---|---|---|---|---|---|
| Mixed composition | Polyester resin (A) | parts by mass | aI-12 | 100 | 100 | — |
| | | | aI-16 | — | — | 100 |
| | Metal organic acid salt (B) [*1] | parts by mass | B1-3 | 0.04 | 0.001 | 0.005 |
| | Polyfunctional glycidyl group-containing styrene-based polymer (C) | parts by mass | CI-1 | 0.3 | 2.5 | 0.5 |
| | Release agent (D) | parts by mass | DI-1 | 0.3 | 0.3 | 0.3 |
| Properties of composition | Titanium atom content | mg/kg | — | 30 | 30 | 30 |
| | Linear oligomer content | mg/kg | — | 900 | 850 | 970 |
| Characteristics of molded article | Color-b | — | — | 4.6 | 2.0 | 2.6 |
| | Residues on mold | — | — | A | B | B |
| | Haze value | % | — | 5 | 5 | 3 |

[*1] The mass of the metal organic acid salt (B) indicates the atomic weight of the metal (potassium or magnesium) remaining in the polyester resin composition.

TABLE 4

| | Kind | Unit | | Comparative Example I-1 | Comparative Example I-2 | Comparative Example I-3 | Comparative Example I-4 | Comparative Example I-5 | Comparative Example I-6 | Comparative Example I-7 | Comparative Example I-8 |
|---|---|---|---|---|---|---|---|---|---|---|---|
| Mixed composition | Polyester resin (A) | parts by mass | aI-1 | — | — | — | 100 | — | — | — | — |
| | | | aI-4 | — | — | — | — | — | — | — | 50 |
| | | | aI-7 | 100 | 100 | — | — | — | — | — | — |
| | | | aI-8 | — | — | — | — | 100 | — | — | — |
| | | | aI-9 | — | — | 100 | — | — | — | — | — |
| | | | aI-10 | — | — | — | — | — | 100 | 100 | — |
| | | | bI | — | — | — | — | — | — | — | 50 |
| | Metal organic acid salt (B) [*1] | parts by mass | BI-1 | 0.0002 | 0.0002 | 0.005 | 0.0002 | 0.0002 | — | — | 0.0002 |
| | Polyfunctional glycidyl group-containing styrene-based polymer (C) | parts by mass | CI-1 | 0.3 | — | 0.3 | — | 0.3 | — | — | 0.3 |
| | | | CI-2 | — | — | — | — | — | 0.3 | — | — |
| | Release agent (D) | parts by mass | DI-1 | 0.3 | 0.3 | 0.3 | 0.3 | 0.3 | 0.3 | 0.3 | 0.3 |
| Properties of composition | Titanium atom content | mg/kg | — | 80 | 80 | 80 | 80 | 30 | 30 | 30 | 15 |
| | Linear oligomer content | mg/kg | — | 1050 | 1200 | 1050 | 950 | 1050 | 900 | 950 | 600 |
| Characteristics of molded article | Color-b | — | — | 1.8 | 1.8 | 6.1 | 1.8 | 1.9 | 1.6 | 1.6 | 2.0 |
| | Residues on mold | — | — | C | D | C | B | C | D | D | C |
| | Haze value | % | — | 6 | 10 | 10 | 9 | 5 | 4 | 8 | 6 |

[*1] The mass of the metal organic acid salt (B) indicates the atomic weight of the metal (potassium or magnesium) remaining in the polyester resin composition.

TABLE 5

| | Kind | Unit | | Comparative Example I-9 | Comparative Example I-10 | Comparative Example I-11 | Comparative Example I-12 | Comparative Example I-13 | Comparative Example I-14 | Comparative Example I-15 | Comparative Example I-16 |
|---|---|---|---|---|---|---|---|---|---|---|---|
| Mixed composition | Polyester resin (A) | parts by mass | aI-11 | — | — | — | 100 | — | — | — | — |
| | | | aI-12 | — | — | — | — | — | — | 100 | 100 |
| | | | aI-14 | — | — | — | — | — | 50 | — | — |
| | | | aI-15 | 100 | 100 | 100 | — | — | — | — | — |
| | | | aI-16 | — | — | — | — | 100 | — | — | — |
| | | | bI | — | — | — | — | — | 50 | — | — |
| | Metal organic acid salt (B) [*1] | parts by mass | BI-3 | 0.001 | 0.001 | 0.00005 | 0.001 | 0.001 | 0.001 | 0.07 | 0.001 |
| | Polyfunctional glycidyl group-containing styrene-based polymer (C) | parts by mass | CI-1 | 0.3 | — | 0.3 | — | 0.3 | 0.3 | 0.3 | 4 |
| | Release agent (D) | parts by mass | D1-1 | 0.3 | 0.3 | 0.3 | 0.3 | 0.3 | 0.3 | 0.3 | 0.3 |
| Properties of composition | Titanium atom content | mg/kg | — | 80 | 80 | 80 | 80 | 30 | 15 | 30 | 30 |
| | Linear oligomer content | mg/kg | — | 1050 | 1200 | 1050 | 950 | 1050 | 600 | 900 | 800 |
| Characteristics of molded article | Color-b | — | — | 1.8 | 1.8 | 1.7 | 1.8 | 2.0 | 2.0 | 5.3 | 2.0 |
| | Residues on mold | — | — | C | D | C | B | C | B | B | D |
| | Haze value | % | — | 6 | 10 | 6 | 9 | 5 | 6 | 8 | 10 |

[*1] The mass of the metal organic acid salt (B) indicates the atomic weight of the metal (potassium or magnesium) remaining in the polyester resin composition.

As shown in Tables 1 to 3, it can be understood that the polyester resin compositions in Examples I-1 to I-21 had extremely less residues on mold at the time of continuous molding, further the haze value of the glass plate after the fogging test was less than or equal to 5%, and had excellent characteristics. In a case where the compositions are the same as each other, as in the compositions in Examples I-1 and I-3, the smaller the titanium atom content is, the lower the haze value is, therefore, the fogging tended to become favorable.

As shown in Tables 4, and 5, Comparative Examples I-1 to I-16 fall under at least any of an example in which the linear oligomer content is larger than the prescribed range, an example in which the metal organic acid salt B is not contained, an example in which the metal organic acid salt B is excessively contained, an example in which the polyfunctional glycidyl group-containing styrene-based polymer C is not contained, an example in which the polyfunctional glycidyl group-containing styrene-based polymer C is excessively contained, and an example in which the content ratio of the polyethylene terephthalate resin bI in the polyester resin A is larger than the prescribed range, and in Comparative Examples I-1 to I-16, the mold easily became dirty, the haze value was increased, and the fogging tended to be deteriorated, as compared with that in Examples. As in Example I-1 and Comparative Example I-4, when comparing the cases where the compositions other than the polyfunctional glycidyl group-containing styrene-based polymer C were the same as each other, there was a tendency that the amount of the linear oligomers was decreased by containing the polyfunctional glycidyl group-containing styrene-based polymer C.

In Comparative Example I-3, since the amount of the metal organic acid salt B to be added during the polymerization was large, the decomposition reaction was promoted during the polymerization, the content of the linear oligomers was increased, and both of the Color-b value and the haze value were deteriorated. In Comparative Examples I-8 and I-14, the content ratio of polyethylene terephthalate resin bI was large, and the residues on mold and the haze value were deteriorated as compared with those in Examples I-1 to I-21. When the thermal deformation temperature is compared among the cases of Examples I-8, I-9, I-17, and I-18, and Comparative Examples I-8, and I-14, in which the content ratio of the polyethylene terephthalate resin bI is different from one another, the thermal deformation temperature was 145° C. in Examples I-8, and I-17, and 121° C. in Examples I-9, and I-18, while the thermal deformation temperature was 75° C. in Comparative Examples I-8, and I-14, and it was evaluated that the heat resistance was remarkably low in Comparative Examples I-8, and I-14.

Example II (1) Intrinsic viscosity (IV): the intrinsic viscosity (IV) of each of a polybutylene terephthalate resin aII and a polyethylene terephthalate resin bII was determined in the same manner as in Example I.

(2) Terminal carboxyl group concentration (unit: eq/ton, expressed as the acid value): the terminal carboxyl group concentration of each of a polybutylene terephthalate resin aII and a polyethylene terephthalate resin bII was determined in the same manner as in Example I.

(3) Terminal hydroxyl group concentration (unit: eq/ton): the terminal hydroxyl group concentration of a polybutylene terephthalate resin aII was determined in the same manner as in Example I.

(4) Titanium atom content, potassium atom content, and magnesium atom content: the titanium atom content, the potassium atom content, and the magnesium atom content of a polyester resin composition of Example II were determined in the same manner as in Example I.

(5) Oligomer content: the oligomer content of a polyester resin composition of Example II was determined in the same manner as in Example I.

(6) Color-b value (flat plate): the Color-b value (flat plate) of a flat molded article made of a polyester resin composition of Example II was determined in the same manner as in Example I.

(7) Appearance: an injection molding machine (trade name: "EC100N", manufactured by TOSHIBA MACHINE CO., LTD.) was prepared, and a flat molded article of 100 mm×100 mm×2 mm made of a polyester resin composition of Example II was obtained by injection molding using a mold having a mirror surface that had been polished with a file of #6000. This flat molded article had a mirror surface transferred from the mold on one side of the flat molded article. The cylinder temperature at the time of molding was 260° C. and the mold temperature was 60° C. The mirror surface of the flat molded article was visually observed to examine the presence or absence of seeds. The evaluation is as follows.

Y: no seeds, and favorable mirror surface appearance (specularity) are observed

N: seeds are observed, and the appearance is not favorable (8) Fogging (haze value): the Color-b value (flat plate) of a molded article made of a polyester resin composition of Example II was determined in the same manner as in Example I.

(9) Residues on mold acceleration test: the residues on mold were evaluated on the basis of the polyester resin composition of Example II in the same manner as in Example I.

(10) Thermal deformation temperature (load: 0.45 MPa): the thermal deformation temperature (load: 0.45 MPa) of multipurpose test specimen made of a polyester resin composition was determined in the same manner as in Example I.

The ingredients used in Examples and Comparative examples are shown below.

The polyester resin A includes any one of the following polybutylene terephthalate resins "aII", or includes any one of the following polybutylene terephthalate resins "aII", and a polyethylene terephthalate resin "bII".

As the polybutylene terephthalate resin aII, any one of the following resins was used.

aII-1: IV=0.83 dl/g, terminal hydroxyl group=95 eq/ton, acid value=9 eq/ton, and titanium atom content=80 mg/kg (a melt-polymerized resin of IV=0.78 dl/g was used, and solid phase polymerization was performed at 210° C. until reaching IV=0.83 dl/g)

aII-2: IV=0.83 dl/g, terminal hydroxyl group=95 eq/ton, acid value=9 eq/ton, and titanium atom content=30 mg/kg (a melt-polymerized resin of IV=0.78 dl/g was used, and solid phase polymerization was performed at 210° C. until reaching IV=0.83 dl/g)

aII-3: IV=0.83 dl/g, terminal hydroxyl group=90 eq/ton, acid value=6 eq/ton, and titanium atom content=80 mg/kg (a melt-polymerized resin of IV=0.73 dl/g was used, and solid phase polymerization was performed at 210° C. until reaching IV=0.83 dl/g)

aII: IV=0.83 dl/g, terminal hydroxyl group=90 eq/ton, acid value=6 eq/ton, and titanium atom content=30 mg/kg (a melt-polymerized resin of IV=0.73 dl/g was used, and solid phase polymerization was performed at 210° C. until reaching IV=0.83 dl/g)

aII-5: IV=0.83 dl/g (a resin obtained by melt polymerization), terminal hydroxyl group=100 eq/ton, acid value=10 eq/ton, and titanium atom content=30 mg/kg (no special treatment was performed to reduce the content of linear oligomers)

aII-6: IV=0.83 dl/g (a resin obtained by melt polymerization), terminal hydroxyl group=100 eq/ton, acid value=10 eq/ton, and titanium atom content=30 mg/kg (no special treatment was performed to reduce the content of linear oligomers). Provided that as the metal organic acid salt B, potassium acetate was added at the time of melt polymerization (after esterification reaction) of the resin on the assumption that the potassium atom is 90 mg/kg (the residual amount of potassium atoms in the polyester resin composition is 50 mg/kg)

aII-7: IV=0.83 dl/g (a resin obtained by melt polymerization), terminal hydroxyl group=100 eq/ton, acid value=10 eq/ton, and titanium atom content=30 mg/kg (no special treatment was performed to reduce the content of linear oligomers). Provided that as the metal organic acid salt B, potassium acetate was added at the time of melt polymerization (after esterification reaction) of the resin on the assumption that the potassium atom is 450 mg/kg (the residual amount of potassium atoms in the polyester resin composition is 300 mg/kg).

Polyethylene terephthalate resin "bII": IV=0.62 dl/g, and acid value=30 eq/ton.

As the metal organic acid salt B, the following compounds were used.

BII-1: master pellet of potassium acetate (manufactured by Wako Pure Chemical Industries, Ltd.)

BII-2: master pellet of magnesium acetate (manufactured by Wako Pure Chemical Industries, Ltd.)

Note that as the base resin of the above-described master pellets, the same resin as the polybutylene terephthalate resin present in the polyester resin composition to which the master pellets are added was used. The content of the metal organic acid salt B in the master pellet was determined on the basis of the content of potassium atoms in case of BII-1, and the content of magnesium in case of BII-2. As to the content, the potassium atom of BII-1 is 0.2 parts by mass (2000 mg/kg) based on 100 parts by mass of the master pellets, and the magnesium atom of BII-2 is 0.085 parts by mass (850 mg/kg) based on 100 parts by mass of the master pellets.

As the polyfunctional glycidyl group-containing styrene-based polymer C, the following compounds were used.

CII-1: a styrene/glycidyl acrylate copolymer [trade name: "ARUFON UG-4050", manufactured by TOAGOSEI CO., LTD. (Mw: 8500, epoxy value: 0.67 meq/g, and refractive index: 1.55)]

CII-2: a styrene/glycidyl acrylate copolymer [trade name: "ARUFON UG-4070" manufactured by TOAGOSEI CO., LTD. (Mw: 9700, epoxy value: 1.4 meq/g, and refractive index: 1.57)].

As the release agent D, the following compounds were used.

DII-1: a triglycerol behenic acid full ester (trade name: "POEM TR-FB", manufactured by RIKEN VITAMIN Co., Ltd.)

DII-2: a mixture of a pentaerythritol stearic acid full ester and a pentaerythritol palmitic acid full ester (trade name: "Rikester EW-440A", manufactured by RIKEN VITAMIN Co., Ltd.).

As the stabilizer, an antioxidant (trade name: "IRGANOX1010", manufactured by BASF) was used. This stabilizer was contained in an amount of 0.2 parts by mass based on 100 parts by mass of the polyester resin A.

Examples II-1 to II-12, and Comparative Examples II-1 to II-10

In Examples II-1 to II-12, and Comparative Examples II-1 to II-7, and II-10, the ingredients mixed in the combinations shown in Tables 6 to 8 were kneaded in a co-rotating twin-screw extruder set at a cylinder temperature of 250° C. (260° C. in Example II-9, and Comparative Example II-7). That is, a polyester resin A, master pellets containing a metal organic acid salt B, a polyfunctional glycidyl group-containing styrene-based polymer C, a release agent D, and an additive (stabilizer) were mixed in the mixing amounts shown in Tables 6 to 8, respectively, and the resultant mixture was melt-kneaded to obtain strands.

After that, the obtained strands were water-cooled and pelletized. Each of the obtained pellets was dried at 130° C. for 4 hours, and a polyester resin composition corresponding to each of Examples and Comparative Examples was obtained. Further, in Comparative Examples II-8 and II-9, a metal organic acid salt B was added at the time of melt polymerization (after esterification reaction) of the polybutylene terephthalate resin, the other components were added in the same manner as in the above-described method, and each of the polyester resin compositions was obtained. On these polyester resin compositions, each of the above-described evaluation tests (4) to (10) was performed.

With respect to the amount of a metal organic acid salt B, in Comparative Examples II-8 and II-9 in which the metal organic acid salt B had been added at the time of melt polymerization (after esterification reaction), the residual amount (content) in the polyester resin composition after melt kneading was decreased relative to the amount at the time of addition (it is considered that the metal organic acid salt B may have been distilled off in the pressure reduction step at the later stage of polymerization, and in the vent degassing step at the time of melt kneading). Further, in Examples and Comparative Examples in which master pellets containing a metal organic acid salt B was added at the time of melt kneading, the metal organic acid salt B was added by adjusting the concentration so as to obtain the content shown in Tables 6 to 8 using the master pellets prepared in advance. Note that the amount of the polybutylene terephthalate resin contained in the master pellets was added to the amount of polybutylene terephthalate resin aII in Tables.

TABLE 6

| | Kind | Unit | | Example II-1 | Example II-2 | Example II-3 | Example II-4 | Example II-5 | Example II-6 | Example II-7 | Example II-8 | Example II-9 |
|---|---|---|---|---|---|---|---|---|---|---|---|---|
| Mixed composition | Polyester resin (A) | parts by mass | aII-1 | 100 | — | — | — | — | — | — | — | — |
| | | | aII-2 | — | — | 100 | 100 | 100 | 100 | 100 | — | — |
| | | | aII-3 | — | 100 | — | — | — | — | — | — | — |

TABLE 6-continued

|  |  | Kind | Unit |  | Example II-1 | Example II-2 | Example II-3 | Example II-4 | Example II-5 | Example II-6 | Example II-7 | Example II-8 | Example II-9 |
|---|---|---|---|---|---|---|---|---|---|---|---|---|---|
|  |  |  |  | aII-4 | — | — | — | — | — | — | — | 100 | 90 |
|  |  |  |  | bII | — | — | — | — | — | — | — | — | 10 |
|  | Metal organic acid salt (B) [*1] | parts by mass | BII-1 | | 0.001 | 0.001 | 0.001 | 0.005 | 0.001 | — | 0.001 | 0.001 | 0.001 |
|  |  |  | BII-2 | | — | — | — | — | — | 0.001 | — | — | — |
|  | Poly-functional glycidyl group-containing styrene-based polymer (C) | parts by mass | CII-1 | | 0.3 | 0.3 | 0.3 | 0.3 | — | 0.3 | 0.3 | 0.15 | 0.3 |
|  |  |  | CII-2 | | — | — | — | — | 0.3 | — | — | — | — |
|  | Release agent (D) | parts by mass | DII-1 | | 0.3 | 0.3 | 0.3 | 0.3 | 0.3 | 0.3 | — | 0.3 | 0.3 |
|  |  |  | DII-2 | | — | — | — | — | — | — | 0.3 | — | — |
| Properties of composition | Titanium atom content | mg/kg | | | 80 | 80 | 30 | 30 | 30 | 30 | 30 | 30 | 27 |
|  | Linear oligomer content | mg/kg | | | 900 | 600 | 900 | 900 | 890 | 900 | 900 | 620 | 600 |
| Characteristics of molded article | Color-b | — | | | 1.8 | 1.8 | 2.0 | 2.6 | 2.0 | 2.0 | 2.0 | 2.0 | 2.0 |
|  | Appearance | — | | | Y | Y | Y | Y | Y | Y | Y | Y | Y |
|  | Residues on mold | — | | | B | A | B | A | B | B | B | A | A |
|  | Haze value | % | | | 4 | 4 | 3 | 3 | 2 | 3 | 3 | 3 | 3 |

[*1] The parts by mass of the metal organic acid salt (B) indicates the parts by mass of the metal atoms (potassium or magnesium) remaining in the polyester resin composition.

TABLE 7

|  | Kind | Unit |  | Example II-10 | Example II-11 | Example II-12 |
|---|---|---|---|---|---|---|
| Mixed composition | Polyester resin (A) | parts by mass | aII-2 | 100 | 100 | 100 |
|  |  |  | bII | — | — | — |
|  | Metal organic acid salt (B) [*1] | parts by mass | BII-1 | 0.0007 | 0.04 | 0.001 |
|  | Polyfunctional glycidyl group-containing styrene-based polymer (C) | parts by mass | CII-1 | 0.3 | 0.3 | 2.5 |
|  | Release agent (D) | parts by mass | DII-1 | 0.3 | 0.3 | 0.3 |
| Properties of composition | Titanium atom content | mg/kg | — | 30 | 30 | 30 |
|  | Linear oligomer content | mg/kg | — | 900 | 900 | 850 |
| Characteristics of molded article | Color-b | — | — | 1.9 | 4.6 | 2.0 |
|  | Appearance | — | — | Y | Y | Y |
|  | Residues on mold | — | — | B | A | B |
|  | Haze value | % | — | 3 | 5 | 5 |

[*1] The parts by mass of the metal organic acid salt (B) indicates the parts by mass of the metal atoms (potassium or magnesium) remaining in the polyester resin composition.

TABLE 8

|  | Kind | Unit |  | Comparative Example II-1 | Comparative Example II-2 | Comparative Example II-3 | Comparative Example II-4 | Comparative Example II-5 | Comparative Example II-6 | Comparative Example II-7 | Comparative Example II-8 | Comparative Example II-9 | Comparative Example II-10 |
|---|---|---|---|---|---|---|---|---|---|---|---|---|---|
| Mixed composition | Polyester resin (A) | parts by mass | aII-2 | — | — | 100 | 100 | 100 | 100 | 50 | — | — | 100 |
|  |  |  | aII-4 | — | 100 | — | — | — | — | — | — | — | — |
|  |  |  | aII-5 | 100 | — | — | — | — | — | — | — | — | — |
|  |  |  | aII-6 | — | — | — | — | — | — | — | 100 | — | — |
|  |  |  | aII-7 | — | — | — | — | — | — | — | — | 100 | — |
|  |  |  | bII | — | — | — | — | — | — | 50 | — | — | — |
|  | Metal organic acid salt (B) [*1] | parts by mass | BII-1 | 0.001 | 0.001 | — | — | 0.000002 | 0.07 | 0.001 | (0.005) | (0.03) | 0.001 |

TABLE 8-continued

| | Kind | Unit | | Comparative Example II-1 | Comparative Example II-2 | Comparative Example II-3 | Comparative Example II-4 | Comparative Example II-5 | Comparative Example II-6 | Comparative Example II-7 | Comparative Example II-8 | Comparative Example II-9 | Comparative Example II-10 |
|---|---|---|---|---|---|---|---|---|---|---|---|---|---|
| | Polyfunctional glycidyl group-containing styrene-based polymer (C) | parts by mass | CII-1 | — | — | — | 0.3 | 0.3 | 0.3 | 0.3 | 0.3 | 0.3 | 4 |
| | Release agent (D) | parts by mass | DII-1 | 0.3 | 0.3 | 0.3 | 0.3 | 0.3 | 0.3 | 0.3 | 0.3 | 0.3 | 0.3 |
| Properties of composition | Titanium atom content | mg/kg | | — | 30 | 30 | 30 | 30 | 30 | 15 | 30 | 30 | 30 |
| | Linear oligomer content | mg/kg | | — | 1200 | 630 | 950 | 900 | 900 | 900 | 900 | 900 | 800 |
| Characteristics of molded article | Color-b | — | | — | 2.0 | 2.0 | 1.6 | 1.6 | 1.7 | 5.3 | 2.0 | 6.3 | 15.6 | 2.0 |
| | Appearance | — | | — | Y | Y | Y | Y | Y | Y | Y | N | N | Y |
| | Residues on mold | — | | — | D | B | D | D | D | B | B | B | B | D |
| | Haze value | % | | — | 8 | 7 | 8 | 3 | 3 | 8 | 6 | 10 | 14 | 10 |

*¹ The parts by mass of the metal organic acid salt (B) indicates the parts by mass of the metal atoms (potassium or magnesium) remaining in the polyester resin composition.

As shown in Tables 6 and 7, it can be understood that the polyester resin compositions in Examples II-1 to II-12 had extremely less residues on mold at the time of continuous molding, a favorable Color-b value and favorable appearance, and further a haze value of the glass plate after the fogging test of less than or equal to 5%, and thus had excellent characteristics. In a case where the compositions are the same as each other, as in the compositions in Examples II-1 and II-3, the smaller the titanium atom content is, the lower the haze value is, therefore, the fogging tended to become favorable.

As shown in Table 8, Comparative Examples II-1 to II-7, and II-10 fall under at least any of an example in which the metal organic acid salt B is not contained, an example in which the metal organic acid salt B content is outside the prescribed range, an example in which the polyfunctional glycidyl group-containing styrene-based polymer C is not contained, an example in which the polyfunctional glycidyl group-containing styrene-based polymer C is excessively contained, and an example in which the content ratio of the polyethylene terephthalate resin bII in the polyester resin A is larger than the prescribed range, and the mold easily became dirty, the haze value was increased, and the fogging tended to be deteriorated as compared with that in Examples. Further, in Comparative Example II-7 in which the proportion of the polyethylene terephthalate resin bII is high, when the thermal deformation temperature is compared with those of Examples II-3 and II-9 in which the proportions of the polyethylene terephthalate resin bII are different from each other, the thermal deformation temperature was 145° C. in Examples II-3, and 121° C. in Examples II-9, while the thermal deformation temperature was 75° C. in Comparative Example II-7, and it was evaluated that the heat resistance was remarkably low.

In addition, Comparative Examples II-8 and II-9 are examples in which a metal organic acid salt B (potassium acetate) was added during the polymerization, and in Comparative Examples II-8 and II-9, the appearance was deteriorated due to seeds. In particular, it is considered that the Color-b value became remarkably high, and the fogging was deteriorated due to the decomposition of the polybutylene terephthalate resin aII. Accordingly, it was found that an effect of better suppression of residues on mold, or the like can be obtained by adding a metal organic acid salt B using master pellets, and by containing the metal organic acid salt B in a polyester resin composition in a high concentration.

Although the embodiments and Examples of the present invention have been described as in the above, it is also planned from the beginning to appropriately combine the constitutions of the above-described embodiments and Examples.

The embodiments and Examples disclosed herein are examples in all respects, and should not be considered to be restrictive. The scope of the present invention is indicated not by the descriptions described above but by the claims, and is intended to include all modifications within the scope and meaning equivalent to the claims.

The invention claimed is:

1. A polyester resin composition, comprising a polyester resin A containing 70 to 100% by mass of a polybutylene terephthalate resin and 0 to 30% by mass of a polyethylene terephthalate resin,
    wherein
    the polyester resin composition contains a metal organic acid salt B being either one or both of an alkali metal organic acid salt and an alkaline earth metal organic acid salt, and a polyfunctional glycidyl group-containing styrene-based polymer C in an amount of 0.05 to 3 parts by mass based on 100 parts by mass of the polyester resin A,
    the polyester resin composition contains either one or both of alkali metal atoms and alkaline earth metal atoms in an amount of 0.000005 to 0.05 parts by mass based on 100 parts by mass of the polyester resin A, and
    the polyester resin composition has a content of linear oligomers of polybutylene terephthalate of or a content of linear oligomers of the polybutylene terephthalate and linear oligomers of polyethylene terephthalate of less than or equal to 1000 mg/kg.

2. The polyester resin composition according to claim 1, wherein
the polyester resin composition contains either one or both of the alkali metal atoms and the alkaline earth metal atoms in an amount of 0.0005 to 0.05 parts by mass based on 100 parts by mass of the polyester resin A.

3. The polyester resin composition according to claim 1, wherein
the polyester resin composition has a content of titanium atoms of less than or equal to 50 mg/kg.

4. The polyester resin composition according to claim 1, wherein
a metal kind of the metal organic acid salt B is one or two or more kinds selected from the group consisting of lithium, sodium, potassium, calcium, and magnesium.

5. The polyester resin composition according to claim 1, wherein
the metal organic acid salt B is one or two or more kinds selected from the group consisting of lithium acetate, sodium acetate, potassium acetate, calcium acetate, magnesium acetate, lithium benzoate, sodium benzoate, and potassium benzoate.

6. A light-reflector component, comprising the polyester resin composition according to claim 1.

7. A light reflector, wherein a light reflective metal layer is formed at least on a part of a surface of the light-reflector component according to claim 6.

8. A method for producing a polyester resin composition containing a polyester resin A, a metal organic acid salt B, and a polyfunctional glycidyl group-containing styrene-based polymer C, the method comprising the step of:
adding a master pellet containing the metal organic acid salt B,
wherein
the polyester resin A contains 70 to 100% by mass of a polybutylene terephthalate resin and 0 to 30% by mass of a polyethylene terephthalate resin,
the metal organic acid salt B is either one or both of an alkali metal organic acid salt and an alkaline earth metal organic acid salt,
the master pellet contains either one or both of alkali metal atoms and alkaline earth metal atoms in an amount of 200 to 15000 mg/kg,
the polyester resin composition contains either one or both of alkali metal atoms and alkaline earth metal atoms in an amount of 0.0005 to 0.05 parts by mass based on 100 parts by mass of the polyester resin A and contains the polyfunctional glycidyl group-containing styrene-based polymer C in an amount of 0.05 to 3 parts by mass based on 100 parts by mass of the polyester resin A, and
the polyester resin composition may contain an inorganic filler in an amount of less than 1 part by mass based on 100 parts by mass of the polyester resin A.

9. The method for producing a polyester resin composition according to claim 8, wherein
the master pellet contains at least the polybutylene terephthalate resin.

10. The method for producing a polyester resin composition according to claim 8, wherein
the polyester resin composition has a content of titanium atoms of less than or equal to 50 mg/kg.

11. The method for producing a polyester resin composition according to claim 8, wherein
a metal kind of the metal organic acid salt B is one or two or more kinds selected from the group consisting of lithium, sodium, potassium, calcium, and magnesium.

12. The method for producing a polyester resin composition according to claim 8, wherein
the metal organic acid salt B is one or two or more kinds selected from the group consisting of lithium acetate, sodium acetate, potassium acetate, calcium acetate, magnesium acetate, lithium benzoate, sodium benzoate, and potassium benzoate.

* * * * *